(12) United States Patent
Tanaka et al.

(10) Patent No.: US 7,571,342 B2
(45) Date of Patent: *Aug. 4, 2009

(54) PROCESSOR SYSTEM, INSTRUCTION SEQUENCE OPTIMIZATION DEVICE, AND INSTRUCTION SEQUENCE OPTIMIZATION PROGRAM

(75) Inventors: Isao Tanaka, Osaka (JP); Hiroshi Mizuno, Osaka (JP)

(73) Assignee: Panasonic Corporation, Osaka (JP)

( * ) Notice: Subject to any disclaimer, the term of this patent is extended or adjusted under 35 U.S.C. 154(b) by 66 days.

This patent is subject to a terminal disclaimer.

(21) Appl. No.: 11/716,638

(22) Filed: Mar. 12, 2007

(65) Prior Publication Data

US 2007/0174651 A1 Jul. 26, 2007

Related U.S. Application Data

(63) Continuation of application No. 10/868,357, filed on Jun. 16, 2004, now Pat. No. 7,206,950.

(51) Int. Cl.
G06F 1/00 (2006.01)
G06F 1/32 (2006.01)
G06F 9/46 (2006.01)

(52) U.S. Cl. ............ 713/600; 713/300; 713/320; 713/500; 713/501; 718/100; 718/102; 718/104

(58) Field of Classification Search ......... 713/300, 713/320, 322, 600, 500, 501; 718/100, 102, 718/104, 105
See application file for complete search history.

(56) References Cited

U.S. PATENT DOCUMENTS

| | | | |
|---|---|---|---|
| 3,648,253 A | 3/1972 | Mullery et al. | |
| 4,698,772 A | 10/1987 | Carter | |
| 4,715,013 A | 12/1987 | MacGregor | |
| 5,418,969 A | 5/1995 | Matsuzaki et al. | |
| 5,790,877 A | 8/1998 | Nishiyama et al. | |
| 6,256,743 B1 | 7/2001 | Lin | |
| 6,430,693 B2 | 8/2002 | Lin | |
| 6,928,559 B1 | 8/2005 | Beard | |

(Continued)

FOREIGN PATENT DOCUMENTS

JP 3-286213 12/1991

(Continued)

OTHER PUBLICATIONS

G. Nutt., "Operating Systems: A Modern Perspective", Addison-Wesley, Second Ed. p. 155-179.

(Continued)

*Primary Examiner*—Mark Connolly
(74) *Attorney, Agent, or Firm*—McDermott Will & Emery LLP

(57) ABSTRACT

To reduce power consumption of a processor system including a plurality of processors without degradation of the processing ability, a flag detecting section detects an assignment control flag and a clock control flag added to instruction code. An instruction assignment controlling section outputs the instruction code to a CPU or an HWE based on the detection to have the instruction code executed. A clock controlling section supplies a clock signal having a frequency lower than the maximum clock frequency to one of the CPU and the HWE in which a waiting time arises when the CPU and the HWE operate at the maximum clock frequencies, thus reducing power consumption.

8 Claims, 24 Drawing Sheets

U.S. PATENT DOCUMENTS

| | | |
|---|---|---|
| 6,928,566 B2 | 8/2005 | Nunomura |
| 7,206,950 B2 * | 4/2007 | Tanaka et al. ............... 713/322 |
| 2002/0073348 A1 | 6/2002 | Tani |
| 2002/0184546 A1 | 12/2002 | Sherburne, Jr. |
| 2004/0039954 A1 | 2/2004 | White et al. |
| 2004/0073822 A1 | 4/2004 | Greco et al. |
| 2005/0034002 A1 | 2/2005 | Flautner |

FOREIGN PATENT DOCUMENTS

| | | |
|---|---|---|
| JP | 9-34599 A | 2/1997 |
| JP | 09-138716 | 5/1997 |
| JP | 09-185589 | 7/1997 |
| JP | 9-330300 | 12/1997 |
| JP | 2000-112756 A | 4/2000 |
| JP | 2001-202155 | 7/2001 |
| JP | 2002-49603 | 2/2002 |
| JP | 2002-123331 | 4/2002 |
| JP | 2002-215597 | 8/2002 |
| JP | 2002-215599 | 8/2002 |

OTHER PUBLICATIONS

Japanese Office Action issued in corresponding Japanese Patent Application No. JP 2002-363609 dated Sep. 25, 2007.

* cited by examiner

FIG. 2

| ADDRESS IN STORAGE SECTION | INSTRUCTION | INSTRUCTION CODE | | |
|---|---|---|---|---|
| | | CLOCK CONTROL FLAG | | |
| | | ASSIGNMENT CONTROL FLG | | |
| | | INSTRUCTION CODE BODY | | |
| 0 0 0 0 | LOOP 04 LOOPEND | - - - | 0 1 | 0 0 0 1 |
| ⋮ | ⋮ | | | |
| 0 0 0 3 | LOOPEND | | | |
| 0 0 0 4 | SAVE HWE (A) xxxx | - - - | 0 1 | 0 0 0 1 |
| 0 0 0 5 | | | 0 0 | 1 0 0 1 |
| ⋮ | ⋮ | | | |
| 0 0 0 8 | | | 0 0 | 1 0 0 1 |
| 0 0 0 9 | ADD CPU (A) xxxx | - - - | 0 0 | 0 1 0 0 |
| ⋮ | ⋮ | | | |

FIG. 3

| CLOCK CONTROL FLAG | CLOCK FREQUENCY | |
|---|---|---|
| | CPU | HWE |
| 0 0 − − | 0 (STOP) | − |
| 0 1 − − | f | − |
| 1 0 − − | f / 2 | − |
| 1 1 − − | f / 4 | − |
| − − 0 0 | − | 0 (STOP) |
| − − 0 1 | − | f |
| − − 1 0 | − | f / 2 |
| − − 1 1 | − | f / 4 |

FIG. 12A
INSTRUCTION WRITTEN IN A SOURCE PROGRAM

| INSTRUCTION a<br>4 CLOCKS BY PROCESSOR A |
| INSTRUCTION b<br>12 CLOCKS BY PROCESSOR B |
| INSTRUCTION c<br>4 CLOCKS BY PROCESSOR A |
| INSTRUCTION d |

FIG. 12B

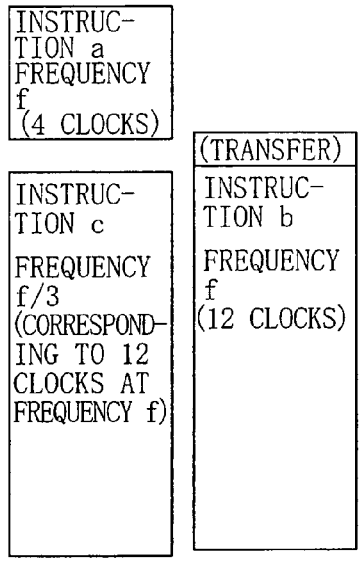

EXECUTION BY PROCESSOR A:
- INSTRUCTION a, FREQUENCY f (4 CLOCKS)
- INSTRUCTION c, FREQUENCY f/3 (CORRESPONDING TO 12 CLOCKS AT FREQUENCY f)

EXECUTION BY PROCESSOR B:
- (TRANSFER)
- INSTRUCTION b, FREQUENCY f (12 CLOCKS)

FIG. 12C
REARRANGED INSTRUCTIONS

| INSTRUCTION b |
| INSTRUCTION a |
| INSTRUCTION c |
| INSTRUCTION d |

FIG. 12D

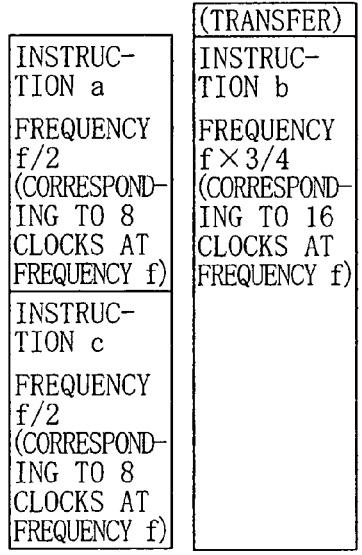

EXECUTION BY PROCESSOR A:
- INSTRUCTION a, FREQUENCY f/2 (CORRESPONDING TO 8 CLOCKS AT FREQUENCY f)
- INSTRUCTION c, FREQUENCY f/2 (CORRESPONDING TO 8 CLOCKS AT FREQUENCY f)

EXECUTION BY PROCESSOR B:
- (TRANSFER)
- INSTRUCTION b, FREQUENCY f×3/4 (CORRESPONDING TO 16 CLOCKS AT FREQUENCY f)

FIG. 12E

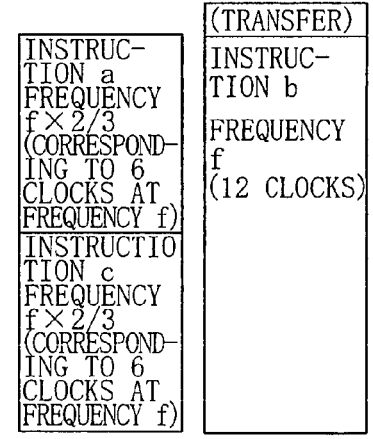

EXECUTION BY PROCESSOR A:
- INSTRUCTION a, FREQUENCY f×2/3 (CORRESPONDING TO 6 CLOCKS AT FREQUENCY f)
- INSTRUCTION c, FREQUENCY f×2/3 (CORRESPONDING TO 6 CLOCKS AT FREQUENCY f)

EXECUTION BY PROCESSOR B:
- (TRANSFER)
- INSTRUCTION b, FREQUENCY f (12 CLOCKS)

PROCESSOR SYSTEM, INSTRUCTION SEQUENCE OPTIMIZATION DEVICE, AND INSTRUCTION SEQUENCE OPTIMIZATION PROGRAM

RELATED APPLICATIONS

The present application is a Continuation of U.S. application Ser. No. 10/868,357, filed on Jun. 16, 2004, now U.S. Pat. No. 7,206,950 the contents of which are hereby incorporated by reference.

BACKGROUND OF THE INVENTION

The present invention relates to a technique for reducing power consumption of a processor system including a plurality of processors such as processing units called a central processing unit (CPU), a hardware engine (HWE) or a coprocessor, for example.

There has been a known technique for reducing power consumption of a CPU by lowering the frequency of a clock signal when the load in processing of the CPU is light (e.g., Japanese Unexamined Patent Publication No. 9-34599.) Also known is a technique for reducing power consumption and heat release of/from an entire system by turning off a power source of an associated unit when a decoded instruction is "no-operation" in a processor system including a plurality of units such as a CPU and a coprocessor (e.g., Japanese Unexamined Patent Publication No. 2000-112756.)

The above-mentioned technique of merely reducing the frequency of a clock signal is applicable when the processing load is light, but is not applicable when a high processing ability is required. Therefore, large reduction of power consumption of an entire system is not always achieved.

In addition, with the technique of turning off a power source for a unit which does not perform processing, power consumption in processing itself is not reduced, and thus great reduction of power consumption is not achieved as well.

SUMMARY OF THE INVENTION

It is an object of the present invention to greatly reduce power consumption particularly of a processor system including a plurality of processors, while enabling both maintenance of the processing ability and reduction of the power consumption.

In order to achieve this object, a first processor system is a processor system including a plurality of processors and is characterized by including:

assignment controlling means for reading instructions to be executed by the respective processors and for controlling assignments of the instructions to the processors; and clock controlling means for controlling the frequencies of clock signals to be supplied to the respective processors, in accordance with the instructions to be executed by the processors according to the assignments.

Then, it is possible to reduce the frequency of a clock signal to be supplied to a processor having a margin in its instruction execution periods, i.e., a processor in which a waiting time arises before completion of execution of instructions by the other processors, thereby reducing power consumption without degradation of the processing ability of the entire processor system. In addition, power consumption may also be reduced by performing parallel processing with clock frequencies and/or power supply voltages reduced.

A second processor system is based on the first processor system and is characterized in that the assignment controlling means includes:

instruction analyzing means for analyzing whether the instructions are executable by the respective processors and for analyzing constraints on the timings of executing the respective instructions;

execution period estimating means for estimating execution periods required of the respective processors to execute the instructions; and assignment determining means for determining assignments of the instructions to the processors based on a result of the analysis and the estimated execution periods, and the assignments of the instructions to the processors are controlled in accordance with the determination by the assignment determining means.

In this system, assignments to processors are determined based on an analysis of instructions. Accordingly, even in a case where instructions indicated by such instruction code that does not include information indicating assignments to processors in particular, assignments are controlled so as to enable reduction of power consumption. As the number of instructions which are referred to for the analysis increases, constraints on timing of executing the instructions and the relationship among the instruction execution periods, for example, are determined more appropriately, thus further ensuring easy reduction of power consumption. However, increase in the number of instructions leads to increase of the scale of a circuit for analysis. Therefore, the number of instructions to be analyzed may be determined in accordance with the processing ability required of a processor system and power consumption, for example. The number of instructions assigned to one processor is not necessarily one. If a sequence of instructions containing a process is executable by a processor with high efficiency, such a sequence of instructions may be assigned as a unit. The execution period is not limited to a value in units of time literally, but may be a value substantially corresponding to the execution period, e.g., a value obtained by variously converting the time such as the number of clocks.

A third processor system is based on the second processor system and is characterized in that the clock controlling means includes:

clock frequency determining means for making a determination based on the estimated execution periods and the determined assignments to the processors such that one of the processors in which a waiting time arises when the processors operate with clock signals having a predetermined frequency is supplied with a clock signal having a frequency lower than the predetermined frequency, and the frequencies of the clock signals to be supplied to the respective processors are controlled in accordance with the determination by the clock frequency determining means.

In this system, the frequency of the clock signal is reduced according to the waiting time, thus ensuring reduction of power consumption without degradation of the processing ability. In addition, clock frequencies are determined based on an analysis of instructions, so that the clock frequencies are controlled so as to reduce power consumption even in a case where instructions in such instruction code that does not include information indicating clock frequencies in particular are executed.

A fourth processor system is based on the second processor system and is characterized in that the assignment determining means is configured to determine the assignments based on the result of the analysis and the estimated execution periods such that if one of the instructions is executable by two or more of the processors, said one of the instructions is assigned to one of the processors which exhibits the shortest execution period for executing the instruction.

This system allows each instruction to be executed by a processor exhibiting the shortest execution period, so that processing efficiency is enhanced and the number of unnecessary switching operations of elements constituting a processor is reduced. Accordingly, power consumption is further reduced in addition to the effects obtained by controlling clock frequencies.

A fifth processor system is based on the second processor system and is characterized in that the assignment determining means is configured to determine the assignments based on the result of the analysis and the estimated execution periods such that a given number of instructions in sequence included in the instructions are executed within the shortest period.

This system reduces power consumption by controlling clock frequencies as described above and also enhances the total processing ability by increasing the parallelism in executing instructions by processors.

A sixth processor system is based on the third processor system and is characterized in that for a given number of instructions in sequence included in the instructions, out of a plurality of combinations of the instructions and the assignments of the instructions to the processors, the assignment determining means selects a combination which achieves the lowest power consumption necessary for executing the given number of instructions in sequence, and said lowest power consumption is obtained by causing one of the processors in which a waiting time arises when the processors operate with clock signals having a predetermined frequency to operate with a clock signal having a frequency lower than the predetermined frequency, and the clock frequency determining means is configured to determine the frequency of the clock signal lower than the predetermined frequency as the frequency of a clock signal to be supplied to said one of the processors.

In this system, assignments to processors are optimized so that power consumption is greatly reduced. Specifically, the waiting time of each processor varies depending on assignments to processors and the degree of reduction of power consumption due to reduction of the clock frequency differs depending on the waiting time. Accordingly, assignments and clock frequencies are determined in the manner as described above, thus further ensuring reduction of power consumption.

A seventh processor system is based on the fourth processor system and is characterized by further including processing proportion setting means capable of setting the range of a proportion of the total execution period required of each of the processors to execute the instructions, wherein the assignment determining means is configured to determine the assignments within the set range of the proportion of the total execution period.

In this system, an extremely large number of instructions are not assigned to one or a small number of processors. Accordingly, increase of the execution period of the entire program due to large degradation of parallelism in processing by the processors is prevented. In addition, the number of sorts (i.e., combinations of assignments) which is taken into consideration to determine assignments for shortening the time required to execute a sequence of instructions or assignments for reducing power consumption is reduced, so that the circuit scale for assignments and others is reduced.

An eighth processor system is based on the first processor system and is characterized in that the assignment controlling means controls the assignments based on assignment control information included in the instructions, and the clock controlling means includes clock frequency determining means for estimating execution periods required of the respective processors to execute the instructions and for making a determination, based on the estimated execution periods and the assignments to the processors indicated by the assignment control information, such that one of the processors in which a waiting time arises when the processors operate with clock signals having a predetermined frequency is supplied with a clock signal having a frequency lower than the predetermined frequency, and the clock controlling means is configured to control the frequencies of the clock signals to be supplied to the respective processors in accordance with the determination by the clock frequency determining means.

As described for the first processor system, this processor system also reduces power consumption by controlling clock frequencies. In addition, the power consumption is reduced with a small circuit scale because an instruction analyzing circuit and other circuits are not needed for assignments.

A ninth processor system is based on the first processor system and is characterized in that the assignment controlling means controls the assignments based on assignment control information included in the instructions, and the clock controlling means controls the frequencies of the clock signals based on the clock control information included in the instructions.

In this system, clock frequencies and assignments to processors are both controlled based on clock control information, thus further reducing the circuit scale.

A tenth processor system is based on the first processor system and is characterized by further including:

voltage controlling means for controlling, in accordance with the control of the frequencies of the clock signals by the clock controlling means, at least either power supply voltages to be supplied to the respective processors or voltages to be supplied to substrate nodes of transistors constituting the respective processors.

In this manner, power supply voltages and substrate voltages are controlled, thereby further reducing power consumption. Specifically, if clock frequencies are set lower than a predetermined frequency as described above, a margin for a delay in a circuit is increased, so that power supply voltages are allowed to be reduced and substrate voltages are allowed to be controlled so as to increase the threshold voltage of an element constituting each processor. As a power supply voltage decreases, power consumption is reduced with the square of the power supply voltage. Increase of the threshold voltage reduces leakage current in the element. Therefore, power consumption is further reduced in addition to the effect of reducing the power consumption by reducing the number of unnecessary switching operations due to reduction of clock frequencies.

An eleventh processor system is based on the first processor system and is characterized by further including cooling controlling means for controlling operation of cooling means in accordance with the frequencies of the clock signals.

A twelfth processor system is based on the tenth processor system and is characterized by further including cooling controlling means for controlling operation of cooling means in accordance with the frequencies of the clock signals and voltages controlled by the voltage controlling means.

These systems ensure prevention of thermal runaway of a processor system, for example, by sufficient cooling and also reduces power consumption involved in cooling.

A first instruction sequence optimization device is an instruction sequence optimization device for optimizing an instruction sequence to be executed by a processor system including a plurality of processors, and is characterized by including:

instruction analyzing means for analyzing whether instructions included in the instruction sequence are executable by the respective processors or not and for analyzing constraints on the timings of executing the respective instructions;

execution period estimating means for estimating execution periods required of the respective processors to execute the instructions;

assignment determining means for determining assignments of the instructions to the processors based on a result of the analysis and the estimated execution periods; and control information adding means for adding assignment control information to the instruction sequence in accordance with the determination by the assignment determining means.

A first instruction sequence optimization program is an instruction sequence optimization program for optimizing an instruction sequence to be executed by a processor system including a plurality of processors, and is characterized by making a computer execute:

an instruction analyzing step of analyzing whether instructions included in the instruction sequence are executable by the respective processors or not and of analyzing constraints on the timings of executing the respective instructions;

an execution period estimating step of estimating execution periods required of the respective processors to execute the instructions;

an assignment determining step of determining assignments of the instructions to the processors based on a result of the analysis and the estimated execution periods; and an assignment control information adding step of adding assignment control information to the instruction sequence in accordance with the determination in the assignment determining step.

Accordingly, it is possible to easily generate an instruction sequence executable by a processor system described as the eighth processor system capable of controlling instruction assignments to processors and reducing power consumption with a small circuit scale.

A second instruction sequence optimization device is based on the first instruction sequence optimization device and is characterized by further including:

clock frequency determining means for determining the frequencies of clock signals to be supplied to the respective processors, in accordance with the instructions to be executed by the processors according to the assignments; and clock control information adding means for adding clock control information to the instruction sequence in accordance with the determination by the clock frequency determining means.

A second instruction sequence optimization program is based on the first instruction sequence optimization program and is characterized by making a computer execute:

a clock frequency determining step of determining the frequencies of clock signals to be supplied to the respective processors, in accordance with the instructions to be executed by the processors according to the assignments; and a clock control information adding step of adding clock control information to the instruction sequence in accordance with the determination in the clock frequency determining step.

Accordingly, it is possible to easily generate an instruction sequence executable by a processor system described as the ninth processor system capable of controlling instruction assignments to processors and clock frequencies and reducing power consumption with a smaller circuit scale.

A third instruction sequence optimization device is based on the second instruction sequence optimization device and is characterized in that the clock frequency determining means is configured to make a determination based on the estimated execution periods and the determined assignments to the processors such that one of the processors in which a waiting time arises when the processors operate with clock signals having a predetermined frequency is supplied with a clock signal having a frequency lower than the predetermined frequency.

A third instruction sequence optimization program is based on the second instruction sequence optimization program is characterized in that in the clock frequency determining step, a determination is made based on the estimated execution periods and the determined assignments to the processors such that one of the processors in which a waiting time arises when the processors operate with clock signals having a predetermined frequency is supplied with a clock signal having a frequency lower than the predetermined frequency.

Accordingly, when the generated instruction sequence is executed by a processor system as the ninth processor system, the frequencies of clock signals are reduced according to the waiting times, thus ensuring reduction of power consumption without degradation of the processing ability of the processor system.

A fourth instruction sequence optimization device is based on the first instruction sequence optimization device and is characterized in that the assignment determining means is configured to determine the assignments based on the result of the analysis and the estimated execution periods such that if one of the instructions is executable by two or more of the processors, said one of the instructions is assigned to one of the processors which exhibits the shortest execution period for executing the instruction.

A fourth instruction sequence optimization program is based on the first instruction sequence optimization program and is characterized in that in the assignment determining step, the assignments are determined based on the result of the analysis and the estimated execution periods such that if one of the instructions is executable by two or more of the processors, said one of the instructions is assigned to one of the processors which exhibits the shortest execution period for executing the instruction.

Accordingly, when the generated instruction sequence is executed by a processor system as the eighth or ninth processor system, each instruction is executed by a processor exhibiting the shortest execution period, so that the clock efficiency is enhanced to reduce the number of unnecessary switching operations of elements constituting a processor. This achieves further reduction of power consumption in addition to the effect by controlling clock frequencies.

A fifth instruction sequence optimization device is based on the first instruction sequence optimization device and is characterized in that the assignment determining means is configured to determine the assignments based on the result of the analysis and the estimated execution periods such that a given number of instructions in sequence included in the instructions are executed within the shortest period.

A fifth instruction sequence optimization program is based on the first instruction sequence optimization program and is characterized in that in the assignment determining step, the assignments are determined based on the result of the analysis and the estimated execution periods such that a given number of instructions in sequence included in the instructions are executed within the shortest period.

Accordingly, when the generated instruction sequence is executed by a processor system as the eighth or ninth processor system, the total processing ability is enhanced by increasing the parallelism in the executions of instructions by processors as well as power consumption is reduced by controlling clock frequencies as described above.

A sixth instruction sequence optimization device is based on the second instruction sequence optimization device and is characterized in that for a given number of instructions in sequence included in the instructions, out of a plurality of combinations of the instructions and the assignments of the instructions to the processors, the assignment determining means selects a combination which achieves the lowest power consumption necessary for executing the given number of instructions in sequence, and said lowest power consumption is obtained by causing one of the processors in which a waiting time arises when the processors operate with clock signals having a predetermined frequency to operate with a clock signal having a frequency lower than the predetermined frequency, and the clock frequency determining means is configured to determine the frequency of the clock signal lower than the predetermined frequency as the frequency of a clock signal to be supplied to said one of the processors.

A sixth instruction sequence optimization program is based on the second instruction sequence optimization program and is characterized in that in the assignment determining step, for a given number of instructions in sequence included in the instructions, out of a plurality of combinations of the instructions and the assignments of the instructions to the processors, a combination which achieves the lowest power consumption necessary for executing the given number of instructions in sequence is selected, and said lowest power consumption is obtained by causing one of the processors in which a waiting time arises when the processors operate with clock signals having a predetermined frequency to operate with a clock signal having a frequency lower than the predetermined frequency, and in the clock frequency determining step, the frequency of the clock signal lower than the predetermined frequency is determined as the frequency of a clock signal to be supplied to said one of the processors.

Accordingly, when the generated instruction sequence is executed by a processor system as the eighth or ninth processor system, power consumption is greatly reduced by optimizing assignments to processors. Specifically, the waiting times of respective processors differ depending on assignments to the processors and the degree of reduction of power consumption due to reduction of clock frequencies varies depending on the waiting times, thus ensuring reduction of power consumption by determining the assignments and the clock frequencies as described above.

A seventh instruction sequence optimization device is based on the fourth instruction sequence optimization device and is characterized by further including processing proportion setting means capable of setting the range of a proportion of the total execution period required of each of the processors to execute the instructions, wherein the assignment determining means is configured to determine the assignments within the set range of the proportion of the total execution period.

A seventh instruction sequence optimization program is based on the fourth instruction sequence optimization program and is characterized by making a computer execute a processing proportion setting step in which the range of a proportion of the total execution period required of each of the processors to execute the instructions is capable of being set, and in the assignment determining step, the assignments are determined within the set range of the proportion of the total execution period.

Accordingly, when the generated instruction sequence is executed by a processor system as the eighth or ninth processor system, an extremely large number of instructions are not assigned to one or a small number of processors. This prevents increase of the execution period of the entire program due to large degradation of parallelism in the processing by the processors. In addition, the number of sorts (i.e., combinations of assignments) which is taken into consideration to determine assignments for shortening the time required to execute a sequence of instructions or assignments for reducing power consumption is reduced, so that processing time necessary for assignments and other processes is reduced and assignment control information, for example, is added at high speed.

An eighth instruction sequence optimization device is based on the first instruction sequence optimization device and is characterized by further including rearrangement means for rearranging executions of instructions included in the instruction sequence in a different order such that power consumption in executing the instruction sequence by the processor system is lower than that before the rearrangement.

An eighth instruction sequence optimization program is based on the first instruction sequence optimization program and characterized by making a computer execute a rearrangement step of rearranging executions of instructions included in the instruction sequence in a different order such that power consumption in executing the instruction sequence by the processor system is lower than that before the rearrangement.

Accordingly, when the instruction sequence generated with the optimized instruction-execution order is executed by a processor system as the eighth or ninth processor system, power consumption is greatly reduced. Specifically, the waiting times of respective processors can differ depending on the order of executing instructions so that the degree of reduction of power consumption due to reduction of clock frequencies varies depending on the waiting times. As a result, power consumption is further reduced with ease.

BRIEF DESCRIPTION OF THE DRAWINGS

FIG. 2 shows an example of instruction code.

FIG. 3 shows an example of clock control flags added to instruction code.

FIGS. 12A through 12E show examples of a relationship of the order of executing instructions with respect to clock frequencies and execution periods.

DESCRIPTION OF THE PREFERRED EMBODIMENTS

Figure 1:
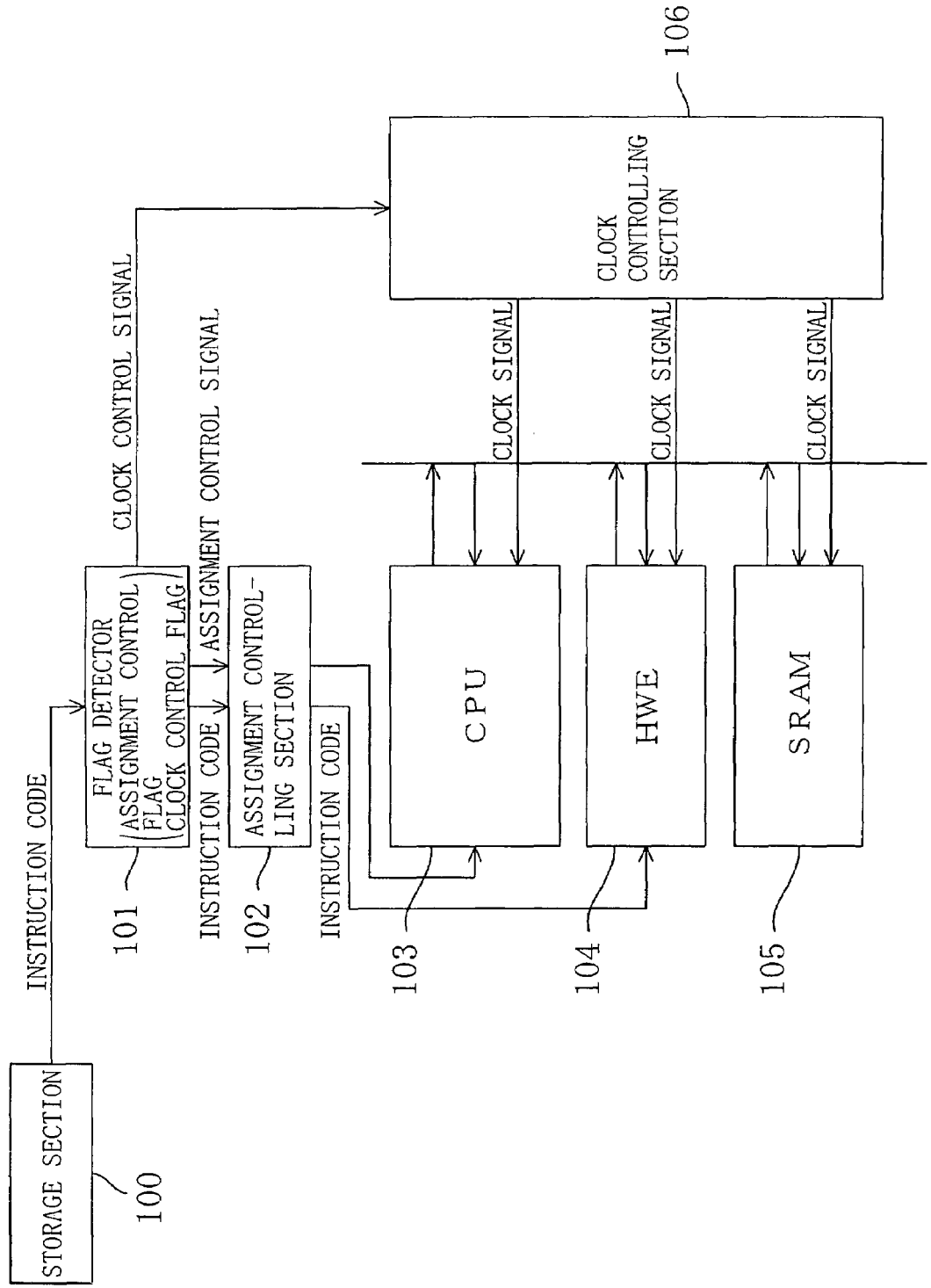
FIG. 1 is a block diagram showing a configuration of a main portion of a processor system according to embodiment 1.

Hereinafter, embodiments of the present invention will be described with reference to the drawings.

(Outlines of the Present Invention and Relationship Between Power Consumption and Clock Frequency, for Example)

First, a relationship among power consumption, a clock frequency and others related to a mechanism for reducing power consumption according to the present invention will be described.

(Relationship of Power Consumption to Clock Frequency and Power Supply Voltage)

Power consumption of a CMOS transistor circuit generally has the following relationship with respect to a clock frequency and a power supply voltage if leakage current is disregarded:

$$P \propto K \times C \times Vdd^2 \times f \quad (1)$$

wherein
P: power consumption
K: switching probability of a transistor
C: load capacity to be driven
Vdd: power supply voltage
f: clock frequency (operating frequency of a transistor)

As shown by the above expression, if the power supply voltage or the clock frequency is lowered, power consumption is reduced. Specifically, during a given period, if the number of execution cycles at a clock frequency is larger than the number of execution cycles necessary for a process (a process determined by a combination of details of the process and data), unnecessary toggling (ON/OFF switching) of transistors is performed because the number of execution cycles necessary for the given process is constant. In view of this, if the clock frequency is lowered to reduce the number of execution cycles within the given period, the number of unnecessary toggling operations is reduced and thereby power consumption is reduced.

In addition, reduction of the clock frequency increases a margin for timing constraints on circuit operation, so that the power supply voltage is allowed to be reduced as described below. Accordingly, power consumption (which is proportional to the square of the power supply voltage as described above) is further reduced.

(Relationship of Delay Time of Circuit to Power Supply Voltage and Threshold Voltage of Transistor)

Delay time (gate delay time) of a circuit has the following relationship with respect to a power supply voltage and a threshold voltage of a transistor:

$$td \propto Vdd \times C/(Vdd-Vt)^2 \quad (2)$$

wherein
td: delay time of a circuit
C: load capacity to be driven
Vdd: power supply voltage
Vt: threshold voltage of a transistor Suppose the load capacity to be driven is constant, the delay time is determined by the power supply voltage and the threshold voltage. Specifically, for example, in a case where the threshold voltage is 0.4 V, suppose the delay time with a power supply voltage of 2.5 V is td1, and the delay time with a power supply voltage of 1.75 V is td2, the relationship of td2/td1≈1.69 is established. If the power supply voltage decreases from 2.5V to 1.75V, the delay time increases about 1.69 times. A circuit which normally operates with a power supply voltage of 2.5V at a clock frequency of f is operable even with a reduced power supply voltage of 1.75V as long as the clock frequency is about f/1.69≈0.59×f. If the circuit operates at a clock frequency of about 0.59×f the power supply voltage is allowed to be reduced to 1.75V. Accordingly, as shown by Expression (1), if the clock frequency is reduced, power consumption is reduced by not only the reduction of the clock frequency itself but also reduction of the power supply voltage.

If a margin for a circuit delay increases by the reduction of the clock frequency, the power supply voltage is reduced as described above. Likewise, if the threshold voltage is increased, the leakage current is reduced. Specifically, if the threshold voltage is increased from 0.4V to 0.5V with a power supply voltage of 2.5V, the delay time increases by 1.1025 times according to Equation (2), but the leakage current decreases by about an order of magnitude. Accordingly, the reduction of the clock frequency also achieves reduction of power consumption due to the reduction of the leakage current.

Specifically, the foregoing setting of the threshold voltage is performed by controlling the voltage at a semiconductor substrate, i.e., by applying a reverse bias voltage between a substrate node (a well, if provided) and a source node of a transistor. More specifically, with recent miniaturization of circuits in semiconductor processes, a threshold voltage has decreased (scaling) and the circuit scale has increased by incorporating a large-capacity memory in a semiconductor chip, for example, resulting in that the increase of leakage current tends to be more and more conspicuous. On the other hand, if a clock frequency is reduced to permit an increased delay time, power consumption is reduced by controlling the substrate voltage so as to increase the threshold voltage to reduce the leakage current.

According to the present invention, the above-described relationship of power consumption to a clock frequency, a power supply voltage and a substrate voltage is utilized in order to assign instructions to a plurality of processors which execute the respective instructions and to control the clock frequency, for example, for each of the processors in accordance with processing (processing time for executing an instruction) by the processor. This enables a great reduction of power consumption without deterioration of the total processing ability.

Hereinafter, specific embodiments of the present invention will be described.

Embodiment 1

As Embodiment 1, an example in which assignments of instructions to respective modules (functional blocks), e.g., a CPU and a hardware engine (HWE), and control of clock frequencies are performed based on flags added to the instructions in a processor system constituted by a semiconductor integrated circuit will be descried.

FIG. 1 is a block diagram showing a configuration of a main portion of a processor system. The processor system includes: a storage section 100; a flag detector 101; an instruction assignment controlling section 102; a CPU 103; an HWE 104; an SRAM 105; and a clock controlling section 106. (The flag detector 101 and the instruction assignment controlling section 102 constitute an assignment controlling means, and the flag detector 101 and the clock controlling section 106 constitute a clock controlling means.)

The storage section 100 stores the instruction code to be executed and is constituted by, for example, a ROM in which the instruction code is stored beforehand or a RAM into which the instruction code stored on a hard disk is loaded. The instruction code contains information indicating operation modes related to clock frequencies of the CPU 103 and the HWE 104. Specifically, as shown in FIG. 2, for example, the instruction code is structured such that assignment control flags indicating which one of the CPU 103 and the HWE 104 executes instructions and a clock control flags indicating the frequencies of clock signals for operating the CPU 103 and the HWE 104 are added to the body of the instruction code showing details of the instructions. More specifically, as shown in FIG. 3, for example, in a clock control flag, two most significant bits indicate the frequency of a clock signal to be supplied to the CPU 103 and the two least significant bits indicate the frequency of a clock signal to be supplied to the HWE 104. Such flags can be not only added by, for example, a program designer but also automatically added by using an instruction sequence optimization device which will be described later. Each clock frequency of the CPU 103 is not necessarily specified independently of that of the HWE 104 and vice versa. Alternatively, a combination of clock frequencies may be specified. If clock frequencies are not particularly specified, the highest clock frequency may be selected.

The flag detector 101 outputs the instruction code read out from the storage section 100 and an assignment control signal based on a control flag contained in the instruction code to the instruction assignment controlling section 102 and also outputs a clock control signal based on the clock control flag to the clock controlling section 106.

The instruction assignment controlling section 102 transfers the instruction code to the CPU 103 or the HWE 104 in accordance with the assignment control signal output from the flag detector 101.

The CPU 103 is a general-purpose processor which executes various types of general instructions using a computing resource included therein or the SRAM 105, for example. (The CPU 103 may have a function of controlling various operations of the entire semiconductor integrated circuit.)

On the other hand, the HWE 104 is a processor with which specific operation (routine processing) such as MPEG-4 operation or Viterbi decoding is performed by one or a sequence of instructions at high speed (with small number of processing cycles) and independently of (i.e., separately from) processing by the CPU 103, for example. (In this case, for simplicity, description is given based on the assumption that a loop process from address 0000 through address 0003 shown in FIG. 2, for example, is performed at high speed.)

The SRAM 105 is a shared memory in which temporary data for processing by the CPU 103, the HWE 104 or other processors is stored. As such a memory, an SRAM (Static RAM) which is capable of operating at high speed is generally used, but the present invention is not limited to this.

The clock controlling section 106 supplies, to the CPU 103, the HWE 104 and the SRAM 105, clock signals having frequencies according to the clock control signal output from the flag detector 101.

Figure 4:
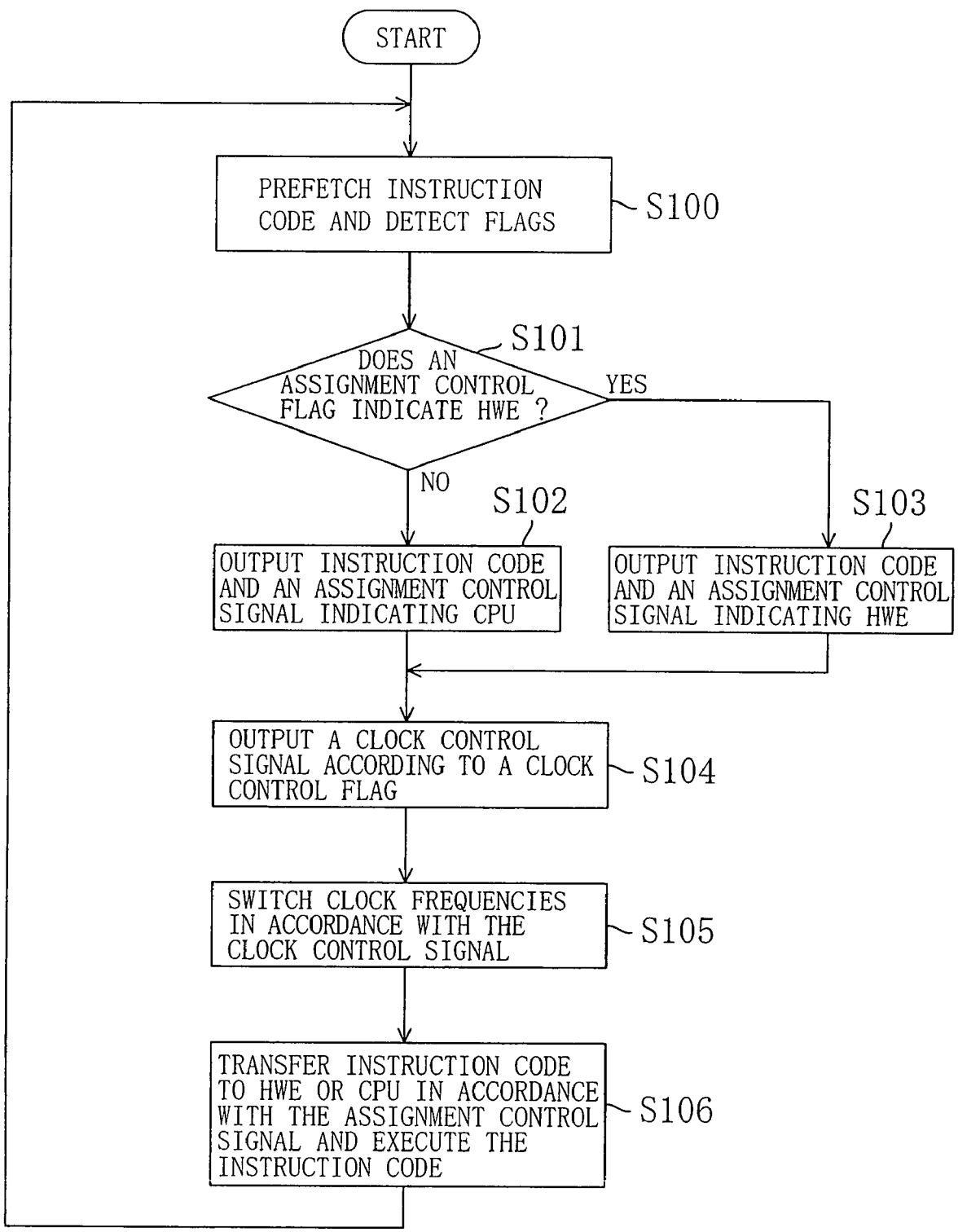
FIG. 4 is a flowchart showing operation of the processor system of embodiment 1.

Now, it will be described how the processor system thus configured operates. FIG. 4 is a flowchart showing control operation performed when an instruction stored in the storage section 100 is executed. The control operation of the processor system is schematically shown in the drawing. However, respective steps are not performed in the order shown in the drawing in practice, and operations of respective sections are generally performed in parallel.

(S100) The flag detector 101 prefetches instruction code (or instruction code sets) stored in the storage section 100 and detects an assignment control flag and a clock control flag contained in the instruction code.

(S100) to (S103) Next, the flag detector 101 then outputs an assignment control signal indicating the CPU 103 or the HWE 104 based on a detection result of the assignment control flag and the instruction code, to the instruction assignment controlling section 102. At this time, the flags may remain in the instruction code or may be removed therefrom.

(S104) Thereafter, the flag detector 101 outputs a clock control signal to the clock controlling section 106 based on a detection result of the clock control flag.

(S105) The clock controlling section 106 switches the frequencies of clock signals to be output to the CPU 103 and the HWE 104, respectively, in accordance with the clock control signal. Specifically, in the example of a program shown in FIG. 2, a clock signal with a frequency of f is supplied to the HWE 104 when instruction code for addresses 0000 through 0004 is executed. On the other hand, a clock signal with a frequency of f/2 is supplied to the CPU 103 when instruction code for addresses 0005 through 0008 is executed whereas a clock signal with a frequency of f is supplied thereto when instruction code for address 0009 is executed. Out of the clock signals supplied to the CPU 103 and the HWE 104, a clock signal with a higher frequency is supplied to the SRAM 105.

(S106) The instruction assignment controlling section 102 transfers the instruction code to the CPU 103 or the HWE 104 in accordance with the assignment control signal output from the flag detector 101. In the example of a program shown in FIG. 2, the instruction code for addresses 0000 through 0004 is transferred to the HWE 104 to be executed. The instruction code for addresses 0005 through 0009 is transferred to the CPU 103 to be executed.

Now, the contents of the program shown in FIG. 2 will be described briefly. Instruction code for addresses 0000 through 0003 indicates that loop operation in which instruction code for addresses 0001 through 0002 is repeated four times is performed. Instruction code for address 0004 indicates that the loop operation causes data to be held in a register (A) in the HWE 104 and then stored in an area represented by address xxxx in the SRAM 105. Instruction code for address 0009 indicates that data stored in the SRAM 105 by the HWE 104 is added to the data which has been held in the register (A) in the CPU 103 after processing for addresses 0005 through 0008 by the CPU 103.

Figure 5:
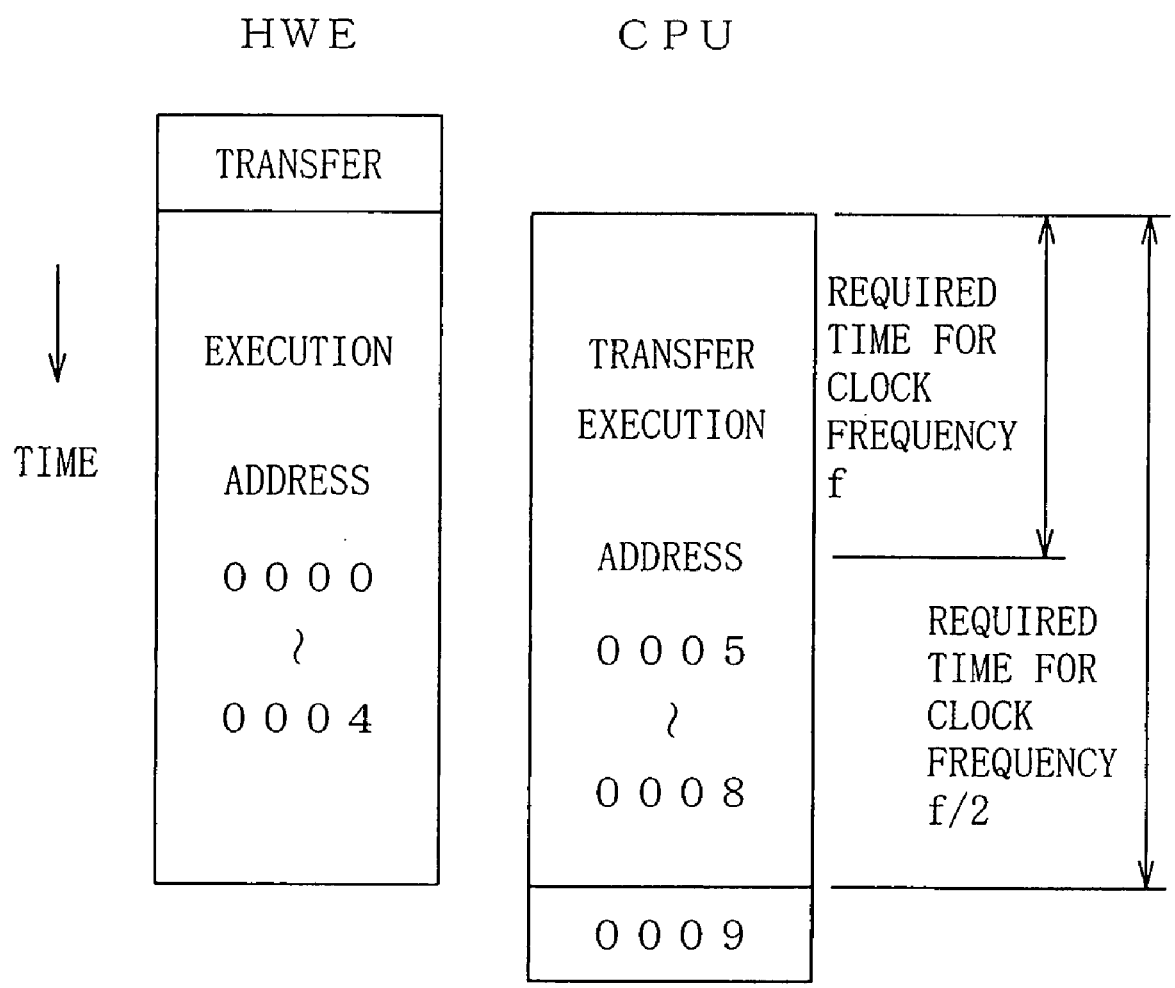
FIG. 5 shows an operation state of the processor system of embodiment 1.

In the execution of such a program, as shown in FIG. 5, instruction code for addresses 0000 through 0004 is transferred to the HWE 104 to be executed. On the other hand, instruction code for addresses 0005 through 0008 is transferred sequentially to be executed, concurrently with the execution by the HWE 104.

Suppose execution of instruction code for addresses 0000 through 0003 by the HWE 104 is performed with two clocks in a loop and is two times as efficient as that by the CPU 103 and execution of instruction code for address 0004 is performed with one clock, for example, then nine clocks (two clocks×four loops+one clock) are required in total. On the other hand, suppose execution of instruction code for addresses 0005 through 0008 by the CPU 103 is performed with four clocks, then the number of required clocks is about ½ of the number of clocks necessary for the loop operation by the HWE 104.

Accordingly, if clock signals with the same frequency of f are supplied to the CPU 103 and the HWE 104, the CPU 103 completes execution of instruction code up to address 0008 in a period which is about ½ of that by the HWE 104. In this case, instruction code for next address 0009 refers to a result of the loop operation by the HWE 104, and thus is not executed until this loop operation terminates. During this period, the CPU 103 wastes electric power. Specifically, in a case where processings by the CPU 103 and the HWE 104 need to be integrated, even if processing by one of the CPU 103 and the HWE 104 is completed earlier (because of a high processing ability due to relatively excessive operating performance), the completed processing needs to wait for a result of the other processing with its internal state maintained. During this waiting period, the idle state continues so that power is continuously consumed because of unnecessary toggling.

As described above, in the processor system of this embodiment, a clock signal with a frequency of f/2 is supplied to the CPU 103 based on the clock control flag when the CPU 103 executes instruction code for address 0005 through 0009. Accordingly, power consumed by the CPU 103 is reduced to about ½ and processing by the CPU 103 terminates almost concurrently with processing by the HWE 104 to which a clock signal with a frequency of f is supplied (i.e., these processings are performed within the same period of time). This avoids degradation of the processing ability of the entire processor system. That is, various processes are performed in an operation mode in which a combination of clock frequencies is optimized to achieve both high processing ability and low power consumption. In addition, assignments to processors and control of clock frequencies are performed based on flags added to instruction code as described above, so that it is unnecessary to provide a complicated decoding circuit or the like. As a result, the circuit scale is reduced.

Depending on the number of necessary clocks for each instruction and the frequency capable of being supplied, the waiting time might not be eliminated. Even such a case, if the waiting time is shortened by using a frequency lower than the maximum, power consumption is reduced without degradation of the processing ability.

If one of the CPU 103 and the HWE 104 does not operate, i.e., no instructions to be executed are assigned thereto, or the timings of terminating executions of instructions by processors do not exactly coincide with each other to cause a waiting time, for example, supply of clock signals may be stopped (or clock signals to be input may be disabled.)

Embodiment 2

Now, an example of an instruction sequence optimization device for generating instruction code to which flags for controlling instruction assignments to processors and clock frequencies are added as described above will be described.

Figure 6:
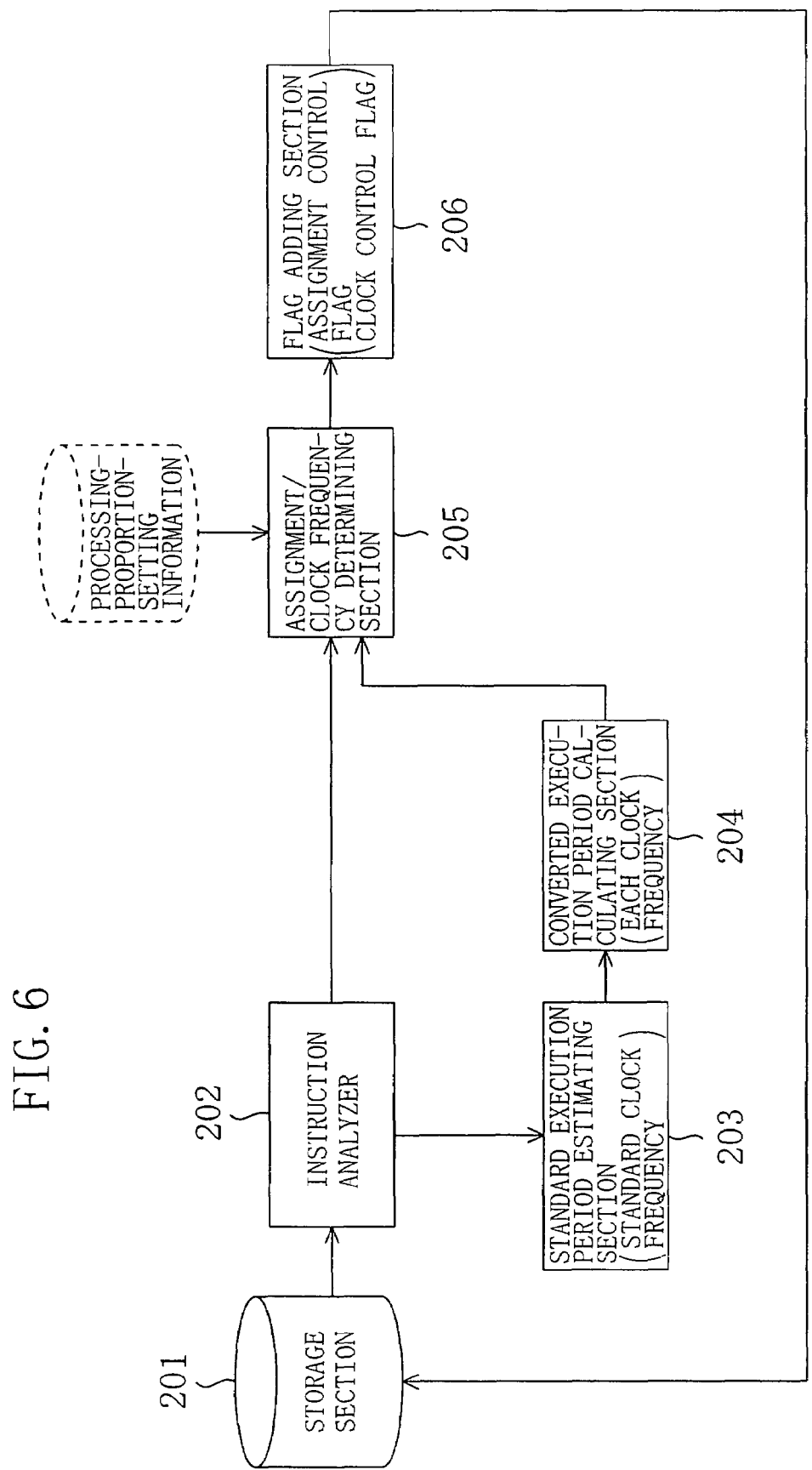
FIG. 6 is a block diagram showing a configuration of an instruction sequence optimization device according to embodiment 2.

The instruction sequence optimization device is constituted by a computer and programs executed by the computer such as a compiler and an optimizer. A functional configuration thereof is shown in FIG. 6.

In the drawing, a storage section 201 stores a source program and an object program before and after addition of flags. Examples of the source program include an executable machine language program made of an instruction code sequence, an assembler and a more abstract C-language program. In the case of the assembler program or the C-language program, for example, flags may be added concurrently with translation into a machine language program, or a machine language program to which flags are added may be generated after an intervening program containing information indicating addition of instruction code has been generated.

An instruction analyzer 202 (instruction analyzing means) analyzes a source program to determine which processor is capable of executing an instruction (including a set of instructions formed by an instruction sequence) contained in the source program and to determine a relationship among instructions (dependency relationship between processes), i.e., constraints on execution timings that if a result of execution of an instruction I1 is referred to for execution of another instruction I2, the instruction I2 is not executed until the instruction I1 is completed.

A standard execution period estimating section 203 (execution period estimating means) estimates a standard execution period during which an instruction is executed by a processor at a standard clock frequency (e.g., the maximum frequency: hereinafter, referred to as a "standard clock frequency".) Specifically, the standard execution period is obtained by referring to a table in which the number of clocks necessary for execution of various instructions by each processor is registered and by multiplying this clock number by the inverse (1/f) of the standard clock frequency. As for the number of necessary clocks, the number of clocks necessary for execution by a given reference processor is obtained in the manner described above and the obtained number of necessary clocks is multiplied by efficiency (the processing ability ratio with respect to the given reference processor) in execution by another processor, thereby easily estimating the number of clocks necessary for the execution by another processor. In a case where loop operation or conditional branches are included in a program, for example, the number of necessary clocks is not always obtained accurately. In such a case, if the number of loop operations or conditional branches, for example, is set by simulation using, for example, sample data, specification by a program designer or the like, an appropriately-estimated value or the worst value is obtained as the number of necessary clocks.

A converted executing time calculating section 204 calculates converted execution periods necessary for a case where instructions are executed by respective processors at various clock frequencies. Specifically, each converted execution period is obtained by standard execution period×(standard clock frequency/each clock frequency). Alternatively, the converted execution periods may be obtained by referring to a table in which converted execution periods corresponding to respective combinations of the standard execution periods and various clock frequencies are registered beforehand.

As a standard execution period and a converted execution period, a value in units of time may be used literally, or the number of clocks may be used instead. Specifically, the number of necessary clocks may be used as a standard execution period, and the number of necessary clocks×(standard clock frequency/each clock frequency) may be used as a converted execution period according to each clock frequency, for example.

Figure 7A:
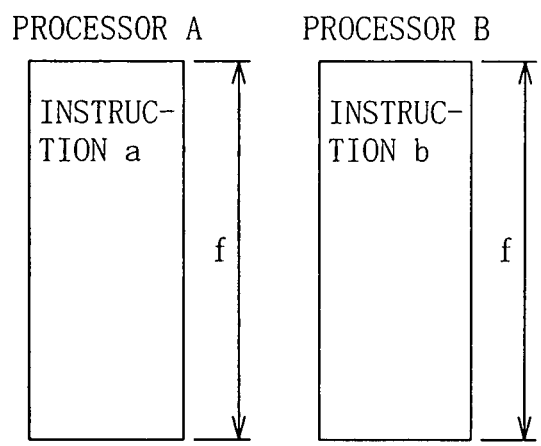
FIGS. 7A and 7B show examples of a relationship of assignments of instructions to processors with respect to clock frequencies and execution periods in the instruction sequence optimization device of embodiment 2.
Figure 7B:
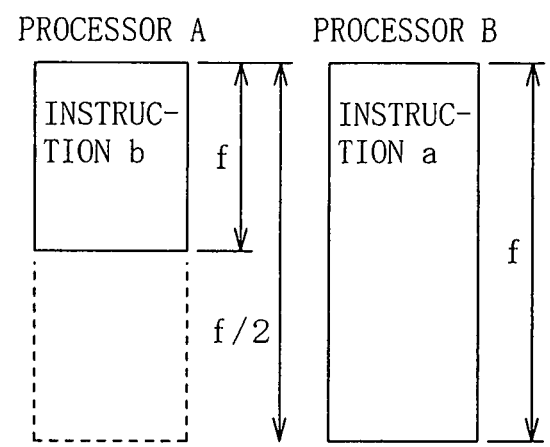

An assignment/clock frequency determining section 205 (assignment determining means and clock frequency determining means) determines assignments of instructions to processors and the frequencies of clock signals to be supplied in executions of the respective instructions so as to minimize power consumption, based on information indicating both constraints on processors capable of executing instructions and the execution timings determined by the instruction analyzer 202 and also based on the converted execution periods for the respective instructions calculated by the converted executing time calculating section 204. Specifically, as shown in FIGS. 7A and 7B, in a case where instructions a and b are executed by processors A and B, for example, suppose the clock frequency is f, both the processors A and B need the same execution period for the instruction a, the period of execution of the instruction b by the processor A is ½ of that by the processor B, and a next instruction is not executed until executions of the instructions a and b are both completed. Then, if the instruction b is executed by the processor A, processing of the processor A has a margin. Accordingly, if the clock frequency of the processor A is adjusted to f/2, power consumption is reduced without an influence on the total processing time.

A flag adding section 206 (assignment control information adding means and clock control information adding means) adds assignment control flags and clock control flags to instruction code including respective instructions as shown in FIG. 2, based on the assignments and frequencies determined by the assignment/clock frequency determining section 205.

Now, it will be described how the instruction sequence optimization device operates with reference to FIG. 8.

(S1000) First, a source program is analyzed and processors capable of executing respective instructions are determined. If a plurality of instructions are executed in parallel, constraints on instruction execution timings, e.g., the constraint that execution of a next instruction is prohibited unless executions of all the current instructions are completed, are detected.

(S1001) Next, it is determined whether or not all the instructions included in the source program are executable only by a given processor. If the determination result is Yes, the process proceeds to (S1006), which will be described later, because all the instructions only need to be executed by the given processor at, for example, the maximum clock frequency.

(S1002) If the determination result at (S1001) is No, the standard execution periods during which the instructions are executed by respective processors at their standard frequencies are estimated.

(S1003) Thereafter, the converted execution periods necessary for executions of the instructions by the processors at various clock frequencies are calculated.

(S1004) Assignments of the instructions to the processors and the frequencies of clock signals to be supplied for executions of the instructions are determined so as to minimize power consumption, based on the converted execution periods thus calculated and a relationship among the instructions (constraints on the timings of executing the instructions) detected at (S1000).

Specifically, first, as described with reference to FIG. 7, among all the combinations of assignments of instructions to processors capable of executing the instructions, a processor which has a margin in its processing when all the processors operate at, for example, standard clock frequencies, i.e., a processor which waits for termination of processing by the other processors, is detected. Then, the minimum clock frequency that does not affect the total processing time of the processor having the margin, i.e., the minimum frequency that allows an operation whose result is referred to by a subsequent instruction to terminate before an operation by the other processors (or a ratio between such a frequency and a standard clock frequency, for example), is obtained. (It should be noted that in practice, each standard execution period and the associated converted execution period are compared so that the frequency corresponding to the longest converted execution period out of the converted execution periods equal to or shorter than the standard execution period may be obtained.)

In this manner, in each combination of assignments, executions of instructions by processors are associated with clock frequencies for the respective executions, so that power consumption (which may be the total number of clocks necessary for executions of instructions, for example, in practice) for each combination of assignments is obtained.

Accordingly, if a combination of assignments which achieves the lowest power consumption is obtained, instruction assignments and clock frequencies for reducing power consumption without degradation of the processing ability are determined.

(S1005) Assignment control flags and clock control flags based on the determined instruction assignments and clock frequencies are added to instruction code of instructions included in the source program, and the resultant instruction code is stored in the storage section 201 as an object program.

(S1006) On the other hand, if all the instructions included in the source program are determined to be executable only by a given processor at (S1001), these instructions only need to be executed by the given processor at, for example, the maximum clock frequency as described above. Accordingly, an assignment flag indicating an assignment to the given processor and a clock control flag indicating the maximum clock frequency are added to instruction code of instructions included in the source program.

(S1007) The processes from (S1002) through (S1005) are repeated until the processing on all the instructions included in the source program is completed.

Accordingly, instruction code in which the assignment control flag and the clock control flag are added in the manner described above is generated, thus obtaining a program allowing a processor system including a plurality of processors as described in embodiment 1 to operate with greatly-reduced power consumption and without degradation of the processing ability.

In (S1004), in cases where the number of combinations of all the assignments is large, for example, consideration of combinations in which an extremely large number of instructions are assigned to a small number of processors may be omitted so that the processing load of the optimization device can be reduced. Specifically, for example, in determining assignments to processors, the proportion of the amount of processing (e.g., processing time or the total number of necessary clocks) by each processor may be limited to a given range based on, for example, predetermined processing-proportion-setting information indicated by the broken lines in FIGS. 6 and 8 (by a processing proportion setting means) so that a combination which achieves the lowest power consumption is selected out of combinations of assignments within the given range. Then, addition of flags as described above is performed at high speed. In such a case, the parallelism in executing instructions by processors is increased, resulting in higher speed in executing all instructions. In particular, if it is possible to set processing proportions individually, power consumption of the processor system, the speed in executing instructions in the processor system and the load in the addition of flags by the optimization device are adjusted depending on purposes of the processor system. In addition, such processes as described above are not necessarily performed at a time for all the instructions included in the source program and may be performed for every given instruction sequence. Even in such a case, if the length of the instruction sequence is appropriately set to reduce local power consumption, the total power consumption is greatly reduced and the number of combinations of assignments is also reduced, thus also reducing the load in processing of the optimization device.

In calculating power consumption, multiplication by a given coefficient may be performed, for example, in consideration of the difference in power consumption among processors so as to ensure reduction of the power consumption.

In the foregoing example, the converted execution periods are used to determine a processor having a margin in its processing and the minimum clock frequency that does not affect the total processing time. However, the present invention is not limited to this example, and standard execution periods may be used. Specifically, the presence of a margin may be determined based on the difference between standard execution periods, for example, or the minimum clock frequency, for example, may be obtained based on the ratio between standard execution periods, for example.

Modified Example of Embodiment 2

Another instruction sequence optimization device in which a flag is added to instruction code in the same manner as for the instruction sequence optimization device of embodiment 2 will be described. Hereinafter, components having similar functions to those described in embodiments 1 and 2, for example, are indicated by the same reference numerals, and thus description thereof will be omitted.

Figure 9:
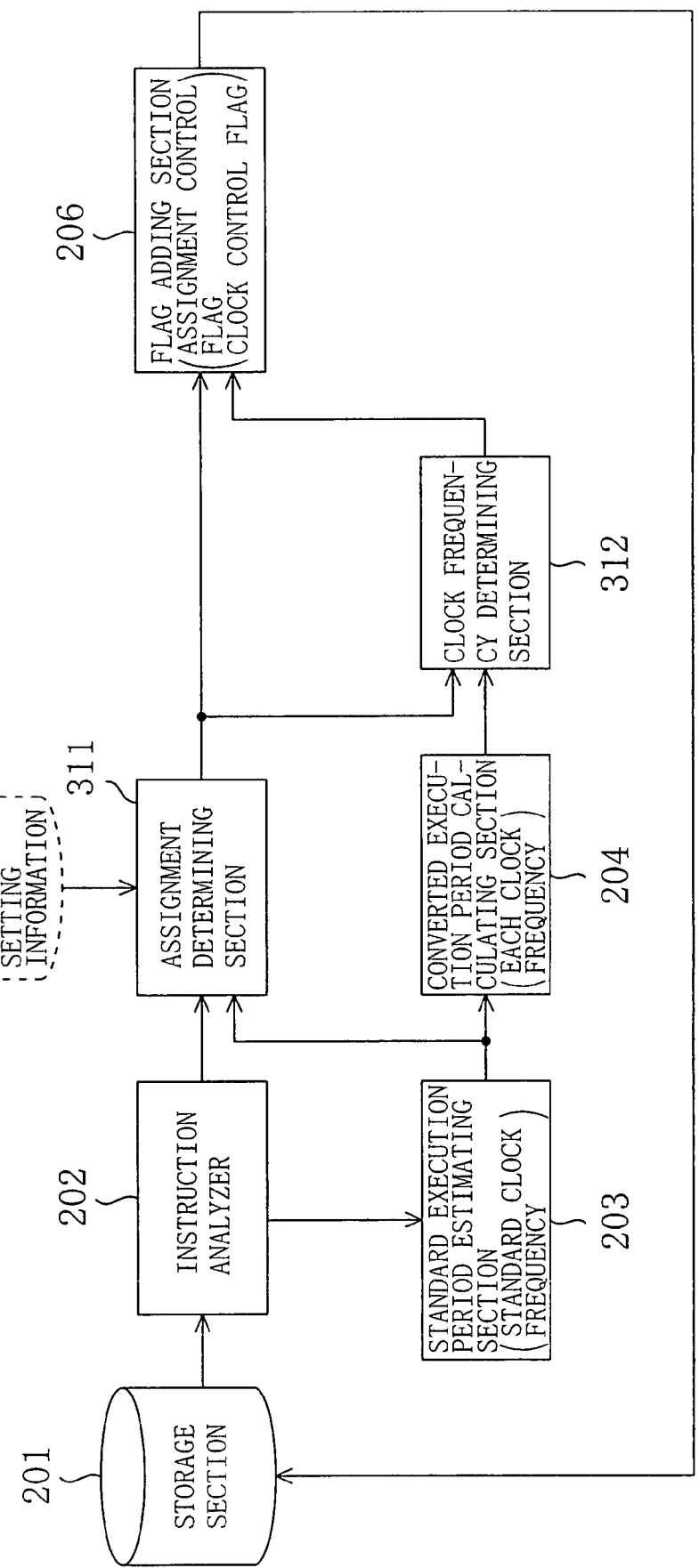
FIG. 9 is a block diagram showing a configuration of an instruction sequence optimization device according to a modified example of embodiment 2.

In this instruction sequence optimization device, assignments of instructions to processors are determined such that an instruction executable by a plurality of processors is executed by a processor exhibiting the shortest standard execution period, and the clock frequency is determined so as to reduce power consumption based on the assignments. Specifically, as shown in FIG. 9, for example, this device is different from that of embodiment 2 (shown in FIG. 6) in that an assignment determining section 311 and a clock frequency determining section 312 are provided instead of the assignment/clock frequency determining section 205.

The assignment determining section 311 determines assignments such that an instruction executable by a plurality of processors is executed by a processor exhibiting the shortest standard execution period (i.e., with the smallest number of necessary clocks) calculated by a standard execution period estimating section 203.

The clock frequency determining section 312 determines clock frequencies so as to make a processor having a margin in its processing when all the processors operate at the standard clock frequencies operates at the minimum clock frequency that does not affect the total processing time (i.e., so as to minimize the waiting time), with respect to the assignments determined as described above.

Figure 10:
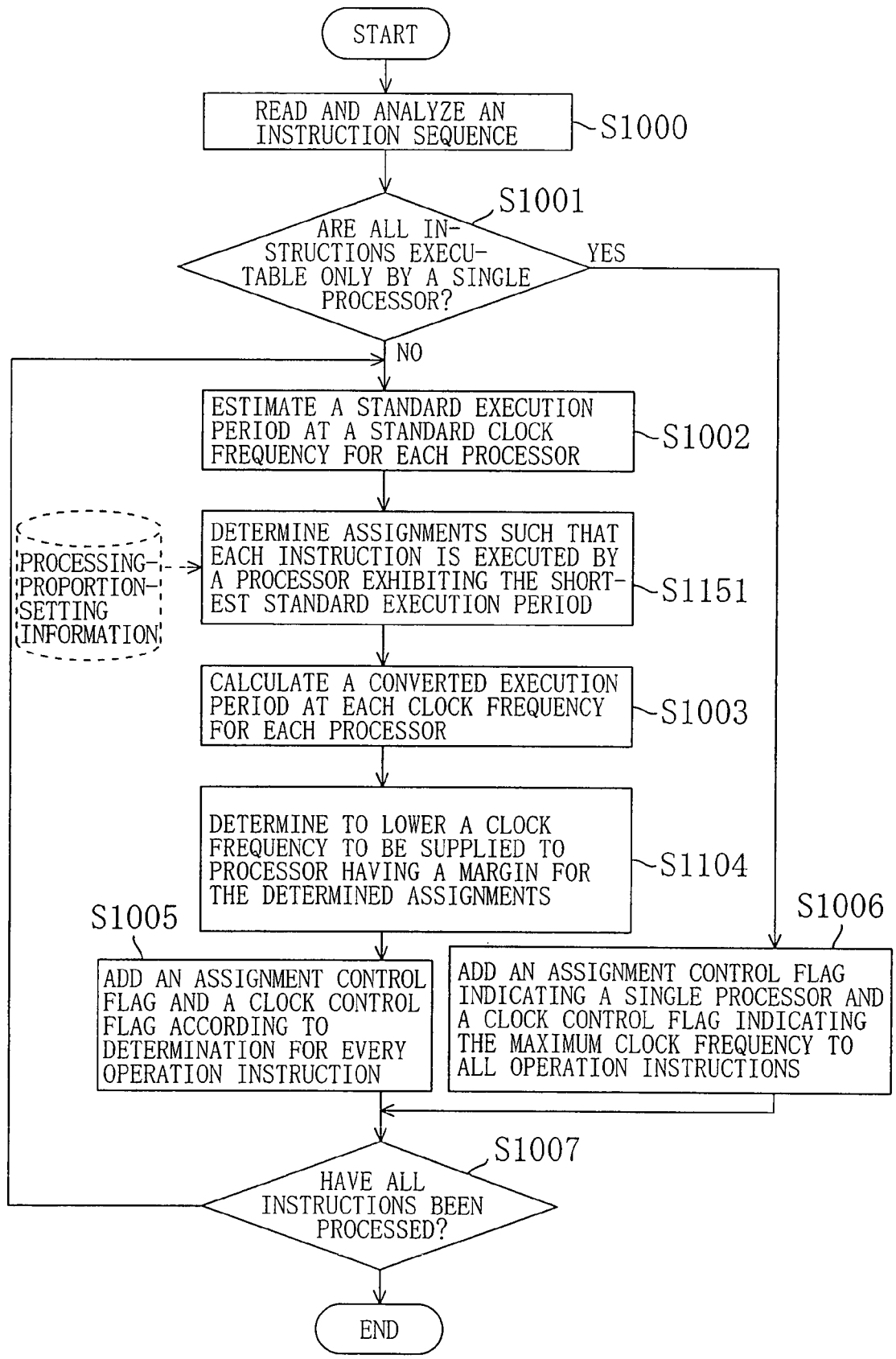
FIG. 10 is a flowchart showing operation of the instruction sequence optimization device of the modified example of embodiment 2.

As shown in FIG. 10, operation of the instruction sequence optimization device thus configured is different from that in embodiment 2 (shown in FIG. 8) in the following processes.

(S1151) After standard execution periods have been calculated (S1002), assignments to processors are determined such that an instruction executable by a plurality of processors is executed by a processor exhibiting the shortest standard execution period.

Figure 8:
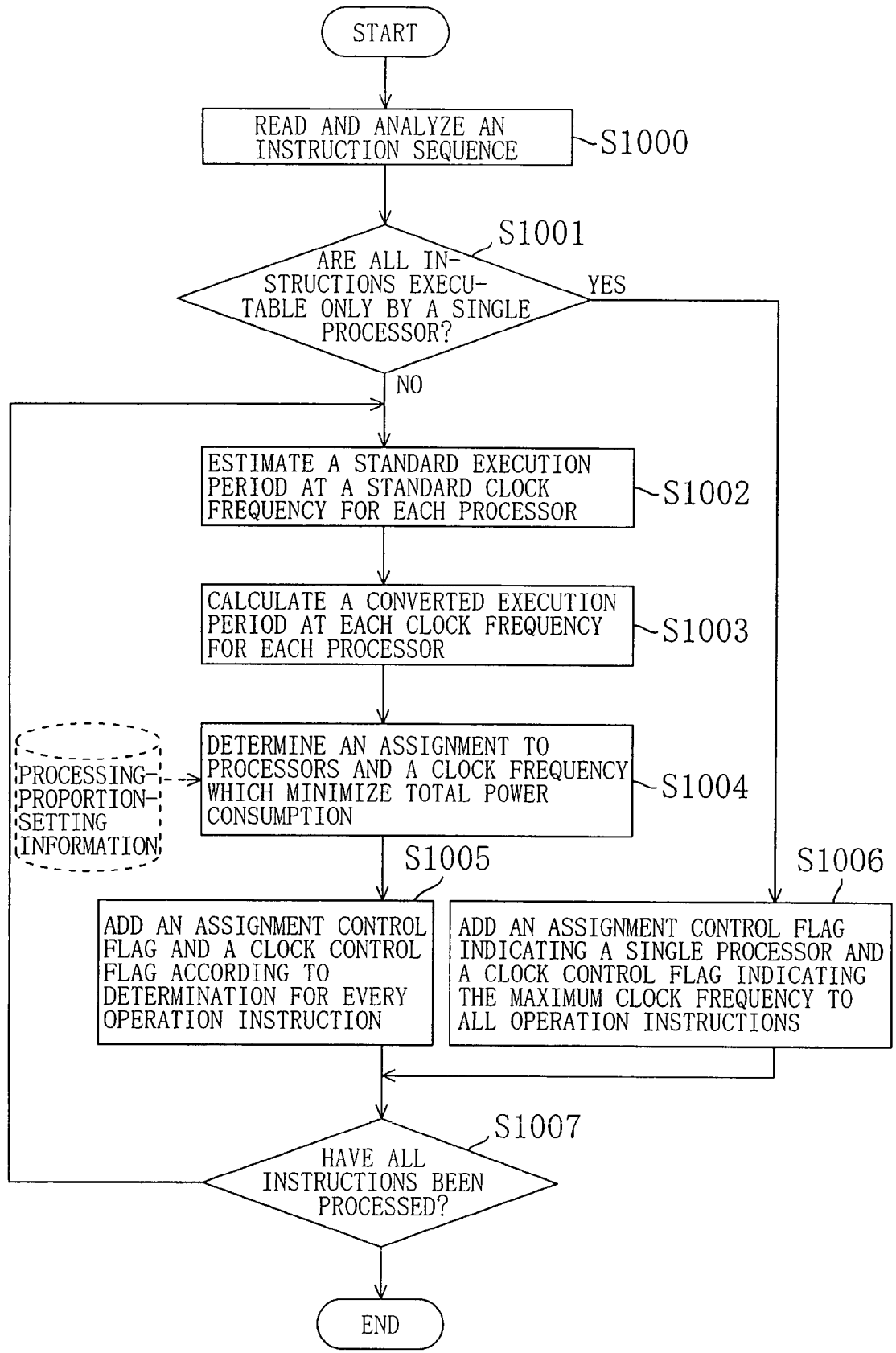
FIG. 8 is a flowchart showing operation of the instruction sequence optimization device of embodiment 2.

(S1104) Unlike (S1004) in FIG. 8, only clock frequencies are determined. Specifically, this determination is performed such that when each instruction is executed is by the processor assigned at (S1151) at the standard clock frequency, a processor in which a waiting time arises (i.e., which has a margin) for termination of other processors is supplied with a clock signal with the minimum frequency that reduces the waiting time and does not affect the total processing time. Accordingly, power consumption is reduced without degradation of the processing ability of the processor system within a range of assignments to processors as described above.

After the assignments to processors and the clock frequencies have been thus determined, assignment control flags and clock control flags according to this determination are added to instruction code at (S1005) in the same manner as in embodiment 2.

As described above, each instruction is executed by a processor exhibiting the shortest standard execution period, efficiency in executing instruction code is enhanced so that the total number of necessary clocks is reduced. In addition, reduction of the frequency of a clock signal supplied to a processor having a margin in its execution period allows reduction of unnecessary toggling of transistors, thus greatly reducing power consumption. Furthermore, determination of the clock frequencies is performed only on a combination of assignments to a set of processors, so that the load in processing by the optimization device is reduced and addition of flags is performed at high speed.

As described above, in a case where assignments are performed such that each instruction is executed by a processor exhibiting the shortest standard execution period, a program including a large number of instructions of the same type might be assigned to one or a small number of processors. In this case, although power consumption is reduced, the parallelism in processing by processors is reduced so that the time required for execution in the entire program becomes longer. Therefore, to shorten the execution period of the entire program even permitting the increase of power consumption to some extent, the proportion of the amount of processing by each processor is limited to a given range based on, for example, proportion setting information as shown by the broken lines in FIGS. 9 and 10, as in embodiment 2.

Instead of being assigned to a processor exhibiting the shortest standard execution period, each instruction may be assigned to a processor such that the execution period for the entire program (or whole of a given instruction sequence) is the shortest when all the processors operate at their standard clock frequencies, for example. Specifically, each instruction executable by a plurality of processors is not necessarily assigned to a processor exhibiting the shortest execution period. If such an instruction is assigned to another processor capable of executing the instruction concurrently with that processor to enhance the parallelism in executing instructions by processors, the execution period of, for example, the entire program is shortened. Even in this case, reduction of the frequency of a clock signal supplied to a processor with a margin in its execution period suppresses unnecessary toggling of transistors, thereby reducing power consumption. In this case, also, if the proportion of the amount of processing by each processor is limited to a given range as described above, for example, so that assignments are determined so as to shorten the execution period within this range, the load in processing by the optimization device is reduced.

Figure 11:
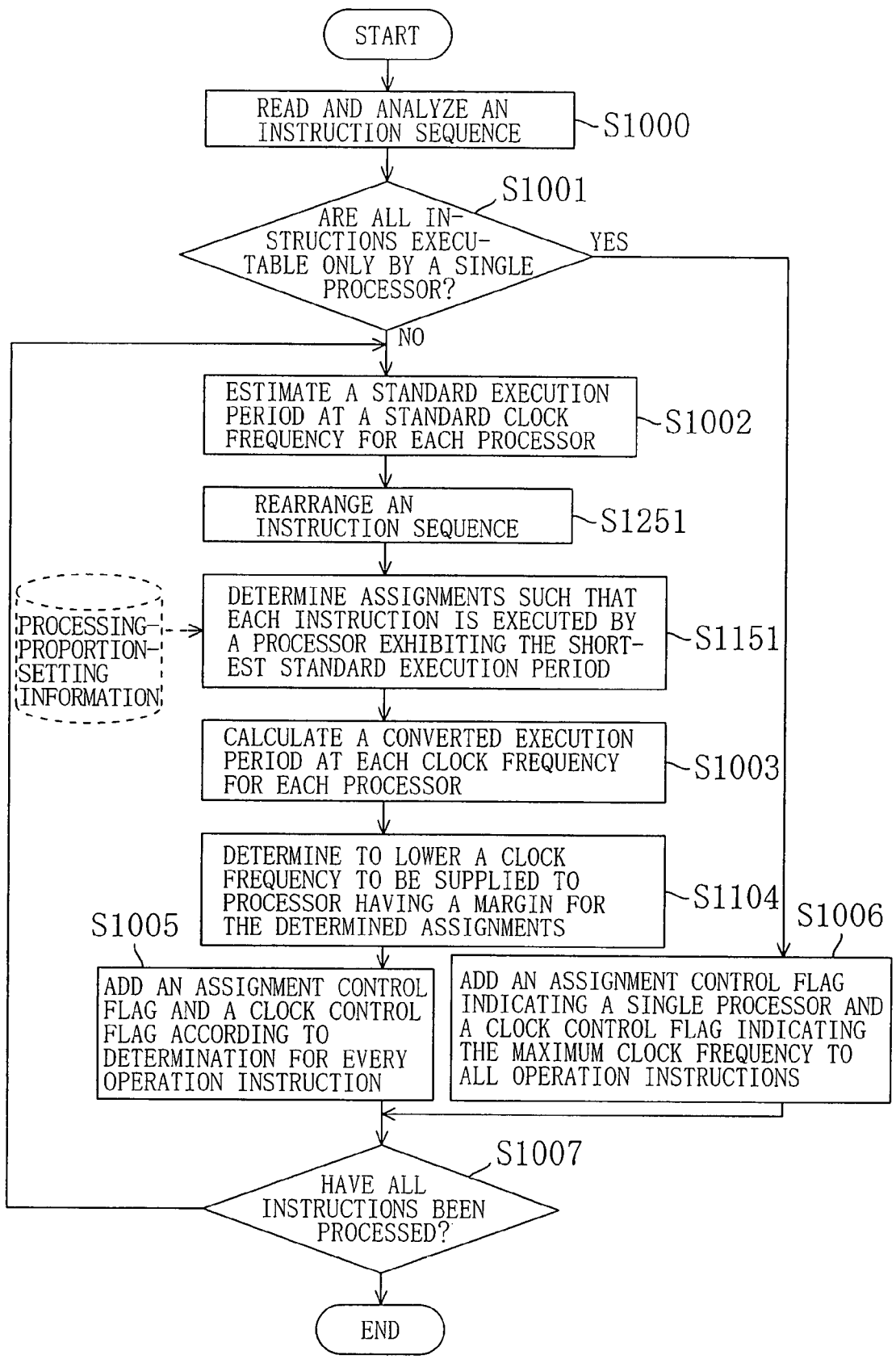
FIG. 11 is a flowchart showing operation of an instruction sequence optimization device of another modified example of embodiment 2.

Moreover, executions of instructions may be rearranged in a different order when the assignment determining section 311 (rearrangement means) determines assignments to processors, for example. More specifically, as shown in FIG. 11, for example, instructions may be rearranged at (S1251) in addition to the steps shown in FIG. 10.

Specifically, in a case where instructions a through d as shown in FIG. 12A, for example, are written in a source program, suppose each of the instructions a and c is sequentially executable with four clocks by a processor A, the instruction b is executable with 12 clocks independently of operation of the processor A after being transferred to a processor B, and the instruction d is executable after executions of the instructions a through c have terminated. Then, if processing is performed in the order as described in the source program, the instructions are executed in the manner shown in FIG. 12B as follows:

(1) The instruction a is executed on conditions that the clock frequency is f and the number of necessary clocks is four, while being sequentially transferred to the processor A.

(2) After termination of the instruction a, the entire instruction b is transferred to the processor B at a time, and then is executed on conditions that the clock frequency is f and the number of necessary clocks is 12.

(3) In parallel with the execution of the instruction b, the instruction c is executed on conditions that the clock frequency is f/3 and the number of necessary clocks is four (the converted execution period when the clock frequency is f corresponds to 12 clocks), while being sequentially transferred.

In a case where executions of instructions are rearranged in a different order as shown in FIG. 12C, the instructions are executed in the manner shown in FIG. 12D as follows:

(1) The whole instruction b is transferred to the processor B at a time, and then is executed on conditions that the clock frequency is f×¾ and the number of necessary clocks is 12 (the converted execution period corresponds to 16 clocks).

(2) In parallel with the execution of the instruction b, the instruction a is executed on conditions that the clock frequency is f/2 and the number of necessary clocks is four (the converted execution period corresponds to eight clocks), while being sequentially transferred to the processor A.

(3) Subsequently, the instruction c is also executed on conditions that the clock frequency is f/2 and the number of necessary clocks is four (the converted execution period corresponds to eight clocks).

That is, executions of the instructions are rearranged in a different order, so that the parallelism in processing by processors is enhanced, thereby increasing a margin in the execution period. Accordingly, each of the instructions a through c can be executed at a low clock frequency, thus greatly reducing power consumption. If the clock frequencies are reduced, power consumption can be further reduced due to, for example, reduction of power supply voltages which will be described later. However, reduction of power consumption by reducing the clock frequency to f/2 with respect to the instructions a and c as that after the rearrangement is greater than that by reducing the clock frequency to f/3 with respect to only the instruction c in the original sequence of executions. The above-described rearrangement of executions of the instructions may be performed such that the instruction b is executed at a clock frequency of f and the instructions a and b are executed at a frequency of f×⅔ as shown in FIG. 12E. In such a case, the total processing speed is enhanced and the power consumption is reduced as compared to that before the rearrangement of executions of the instructions.

Embodiment 3

Now, an example of a processor system capable of reducing power consumption even by using usual instruction code containing no flags, to the same extent as that by controlling clock frequencies and others based on flags added to the instruction code as described in embodiment 1 will be described. Instead of detecting flags added to the instruction code, this processor system has a function of determining assignments of instructions and clock frequencies as the instruction sequence optimization device of embodiment 2 so as to control assignments of instructions and clock frequencies based on the determination.

Figure 13:
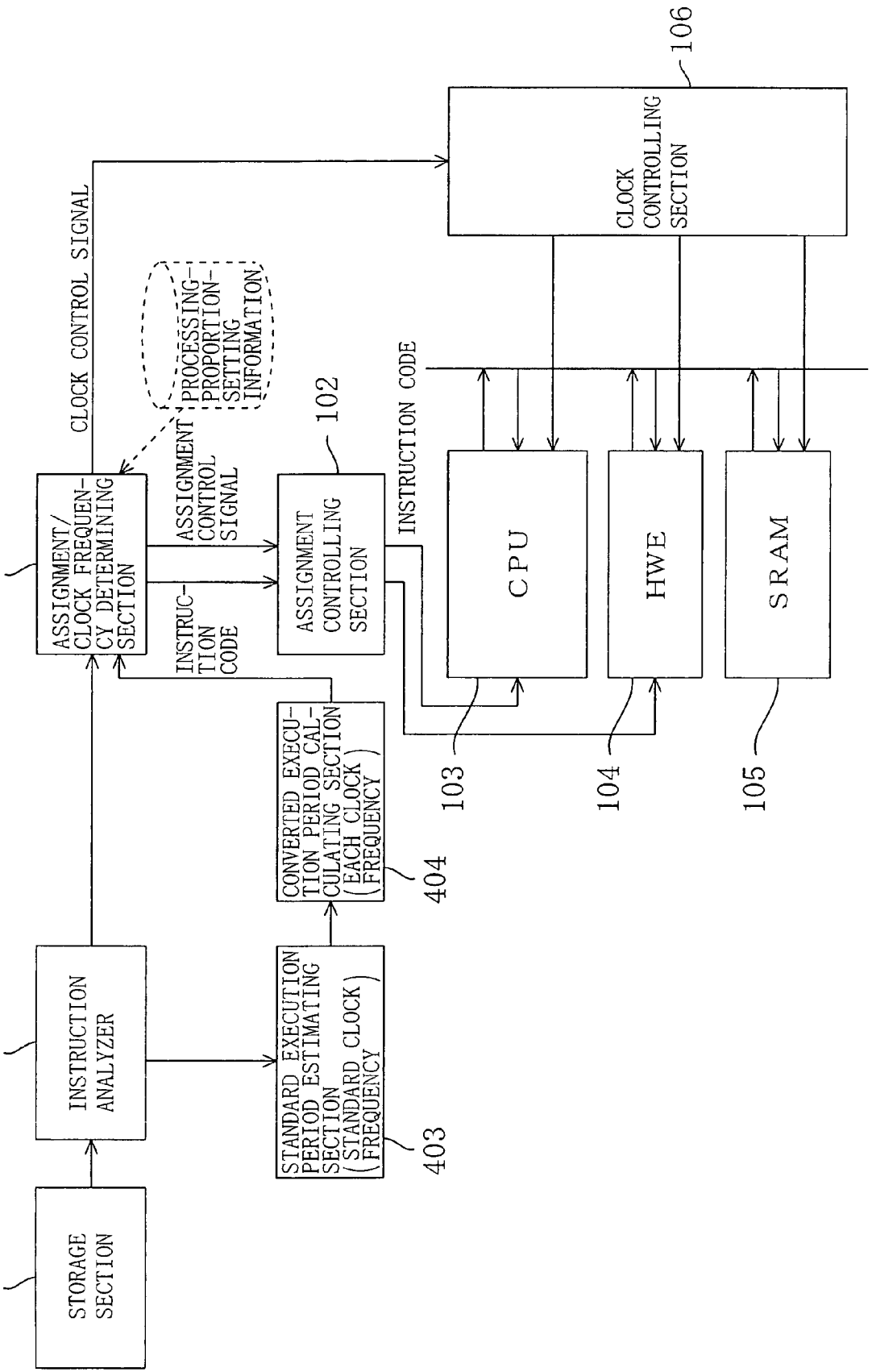
FIG. 13 is a block diagram showing a configuration of a main portion of a processor system according to embodiment 3.

Specifically, as shown in FIG. 13, for example, an instruction analyzer 402 (instruction analyzing means); a standard execution period estimating section 403 (execution period estimating means); a converted execution period calculating section 404; an assignment/clock frequency determining section 405 (assignment determining means and clock frequency determining means) are provided, instead of the flag detector 101 of embodiment 1 (shown in FIG. 1). These components have similar functions to those of the instruction analyzer 202, standard execution period estimating section 203, converted execution period calculating section 204 and assignment/clock frequency determining section 205, respectively, of embodiment 2 (shown in FIG. 6). It should be noted that an instruction sequence optimization device as described in embodiment 2 is provided with the foregoing functions by software and a computer whereas the processor system of this embodiment is configured by hardware for control at timings according to the speed in executing instructions by the CPU 103 and the HWE 104, in general. (However, the present invention is not limited to this, and the control may be achieved by a processor or other processor at a higher level than the CPU 103, for example.)

Figure 14:
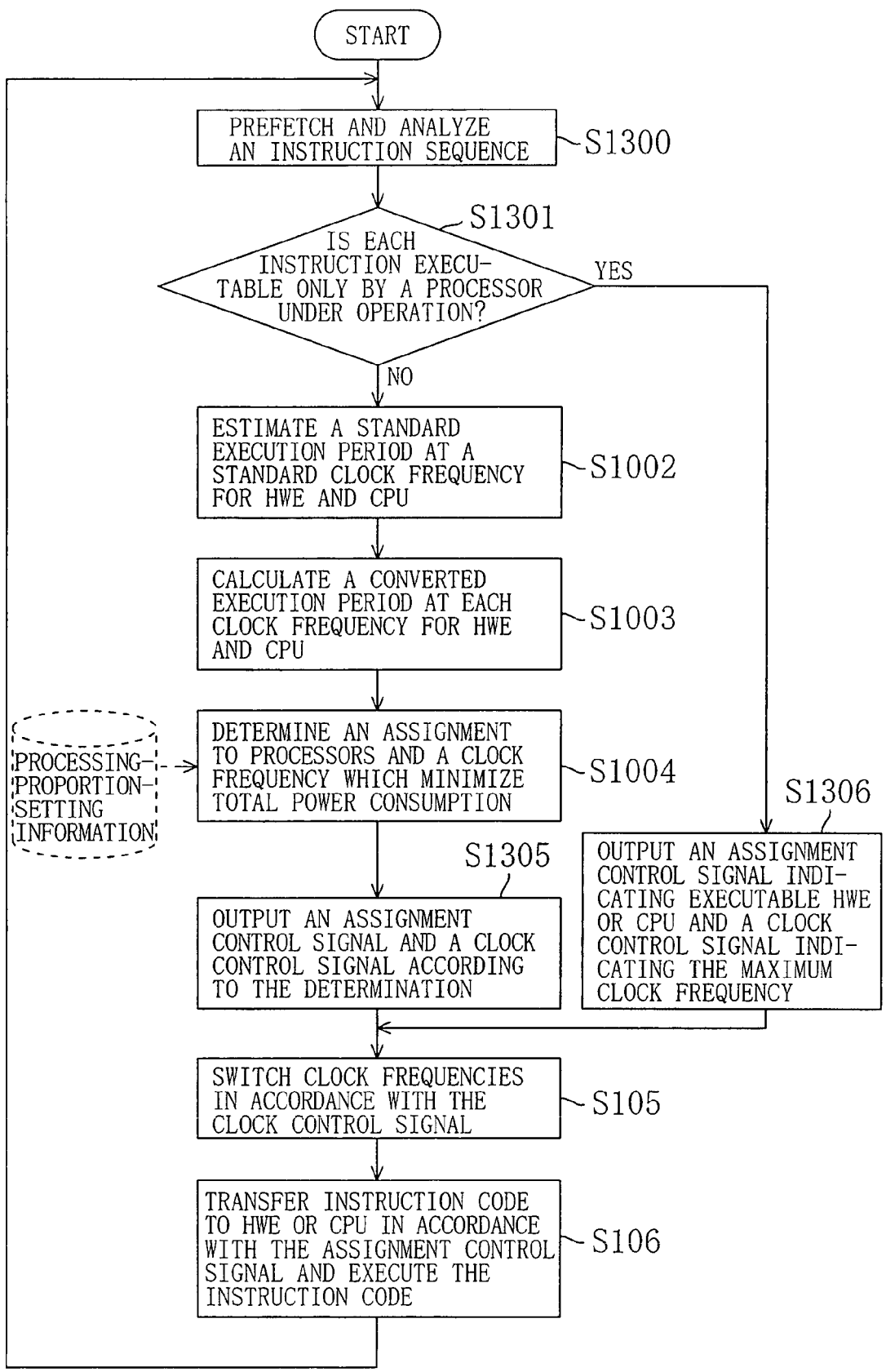
FIG. 14 is a flowchart showing operation of the processor system of embodiment 3.

Operation of this processor system is similar to that of a combination of operations described in embodiments 1 and 2 (shown in FIGS. 4 and 8) as shown in FIG. 14 in general.

(S1300) First, the instruction analyzer 402 prefetches a given amount of an instruction code sequence stored in a storage section 100. The instruction code is analyzed basically in a similar manner to that at (S1000) in embodiment 2. However, if the instruction analyzer 402 is constituted by hardware, the entire instruction code is not necessarily analyzed at a time and every instruction code sequence in the given amount according to the scale of the hardware may be analyzed.

(S1301) Next, if an instruction included in the prefetched instruction code sequence is executable by only one of the CPU 103 and the HWE 104, and this one of the CPU 103 and the HWE 104 which can execute the instruction is under operation (i.e., in a state in which executions of the other instructions are not completed), the process proceeds to (S1306), which will be described later, and then an assignment signal indicating one of the CPU 103 and the HWE 104 which is capable of executing the instruction and a clock control signal indicating, for example, the maximum clock frequency are output. That is, in such a case, the CPU 103 and the HWE 104 do not operate in parallel, so that the whole of the foregoing processing ability depends on execution periods for the respective instructions. Accordingly, the assignments and the clock frequencies need to be set as described above.

(S1002) through (S1004) On the other hand, if instructions included in the instruction code sequence are respectively executable in different ones of the CPU 103 and the HWE 104, or are executable in one of the CPU 103 and the HWE 104 which is not executing another instruction, parallel processing can be performed. Accordingly, standard execution periods are estimated and converted execution periods are calculated in the same manner as described in embodiment 2 (FIG. 8). Then, assignments to processors and clock frequencies are determined so as to minimize power consumption during execution of the prefetched instruction code sequence.

(S1305) An assignment control signal and a clock control signal based on the determinations of the instruction assignments and the clock frequencies are output to the instruction assignment controlling section 102 and the clock controlling section 106, respectively.

(S1306) As described in (S1301), if each instruction included in the prefetched instruction code sequence is executable by only one of the CPU 103 and the HWE 104 and this one of the CPU 103 and the HWE 104 which is capable of executing the instruction is determined to be in a state in which execution of another instruction is not completed, an assignment signal indicating one of the CPU 103 and the HWE 104 which is capable of executing the instruction and a clock control signal indicating the maximum clock frequency are output.

(S105) through (S106) The clock controlling section 106 switches the frequencies of clock signals to be output to the CPU 103, HWE 104 and SRAM 105 in accordance with the clock control signal. The instruction assignment controlling section 102 transfers instruction code to the CPU 103 or the HWE 104 in accordance with the assignment control signal to have instructions executed.

As described above, assignments to processors and the clock frequencies are determined by analyzing instruction code during execution, so that power consumption is reduced even in the case of using usual instruction code in which no flags are added.

In the processor system of this embodiment, as indicated by the broken lines in FIGS. 13 and 14, the proportion of the amount of processing by each processor is limited to a given range (by processing proportion setting means) to select a combination which achieves the lowest power consumption out of combinations of assignments within this range, based on processing-proportion-setting information, for example. Accordingly, the scale of hardware for obtaining the combination of assignments for minimizing power consumption is reduced, and the parallelism in processing by the CPU 103 and the HWE 104 is increased, thereby enhancing the speed in executing the entire instruction sequence.

Modified Example of Embodiment 3

Another processor system capable of reducing power consumption even by using usual instruction code containing no flag as the processor system of embodiment 3 will be described.

Figure 15:
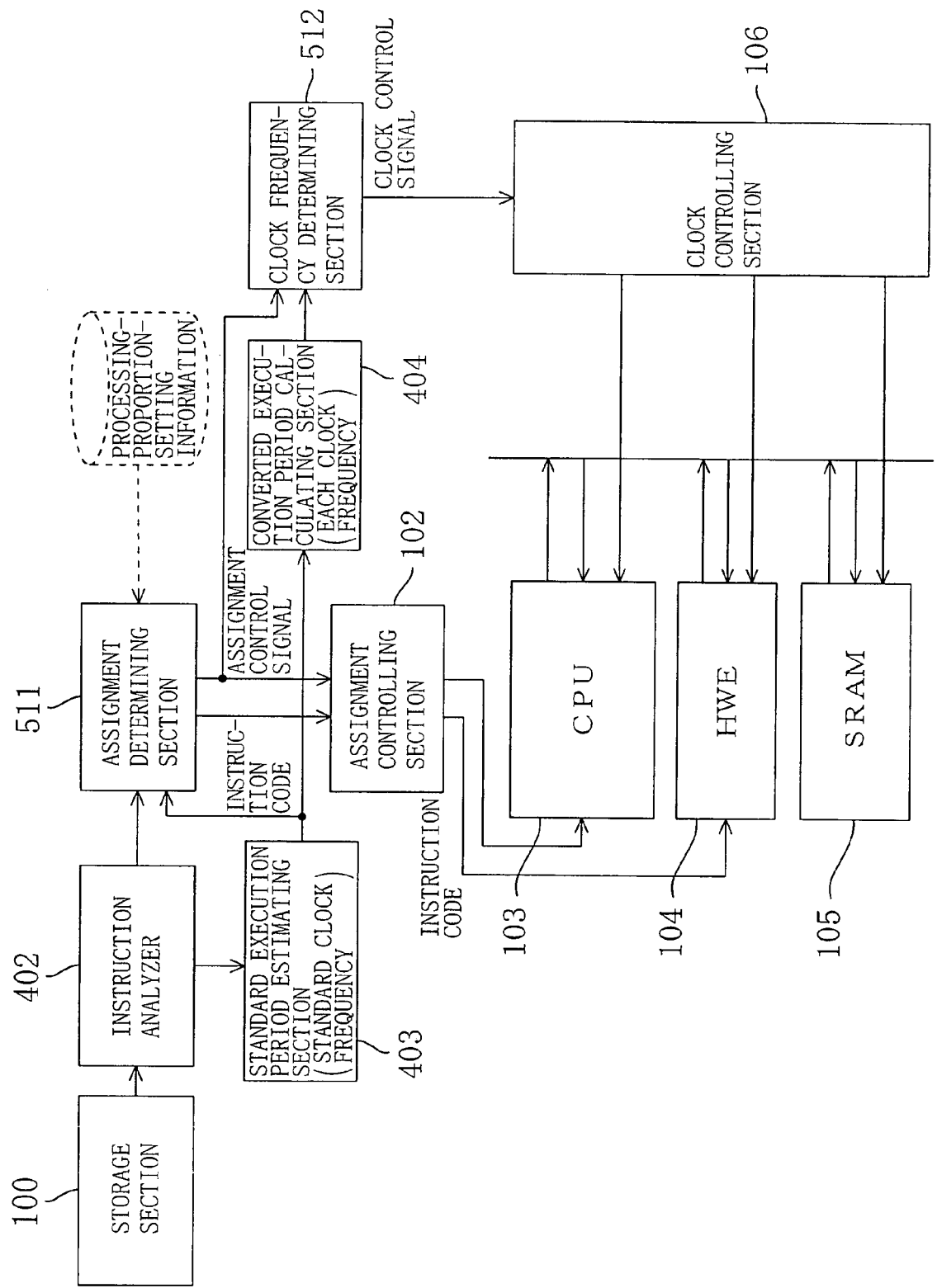
FIG. 15 is a block diagram showing a configuration of a main portion of a processor system according to a modified example of embodiment 3.

This processor system has a similar function to that described in the modified example (shown in FIG. 9) of embodiment 2 to control assignments of instructions and clock frequencies, whereas the processor system (shown in FIG. 13) of embodiment 3 has the function of determining assignments of instructions and clock frequencies as the instruction sequence optimization device (shown in FIG. 6) of embodiment 2. Specifically, assignments of instructions are determined such that an instruction executable by any one of the CPU 103 and the HWE 104 is executed by one of these processors which exhibits a shorter standard execution period and the clock frequencies are determined according to the assignments in such a manner as to reduce power consumption, thereby controlling the assignments and the frequencies. More specifically, as shown in FIG. 15, for example, this modified example is different from embodiment 3 (shown in FIG. 13) in that an assignment determining section 511 and a clock frequency determining section 512 are provided instead of the assignment/clock frequency determining section 405.

The assignment determining section 511 and the clock frequency determining section 512 have respective functions similar to those of the assignment determining section 311 and the clock frequency determining section 312 of the modified example (shown in FIG. 9) of embodiment 2. Specifically, the assignment determining section 511 determines assignments such that each instruction executable by both the processors is executed by one of the processors which exhibits a shorter standard execution period (i.e., with a smaller number of necessary clocks) based on standard execution periods calculated by the standard execution period estimating section 403.

With the assignments thus determined, the clock frequency determining section 512 determines clock frequencies such that one of the processors which has a larger margin in its processing when both the processors operate at, for example, the standard clock frequencies operates at the minimum clock frequency that does not affect the total processing time.

Figure 16:
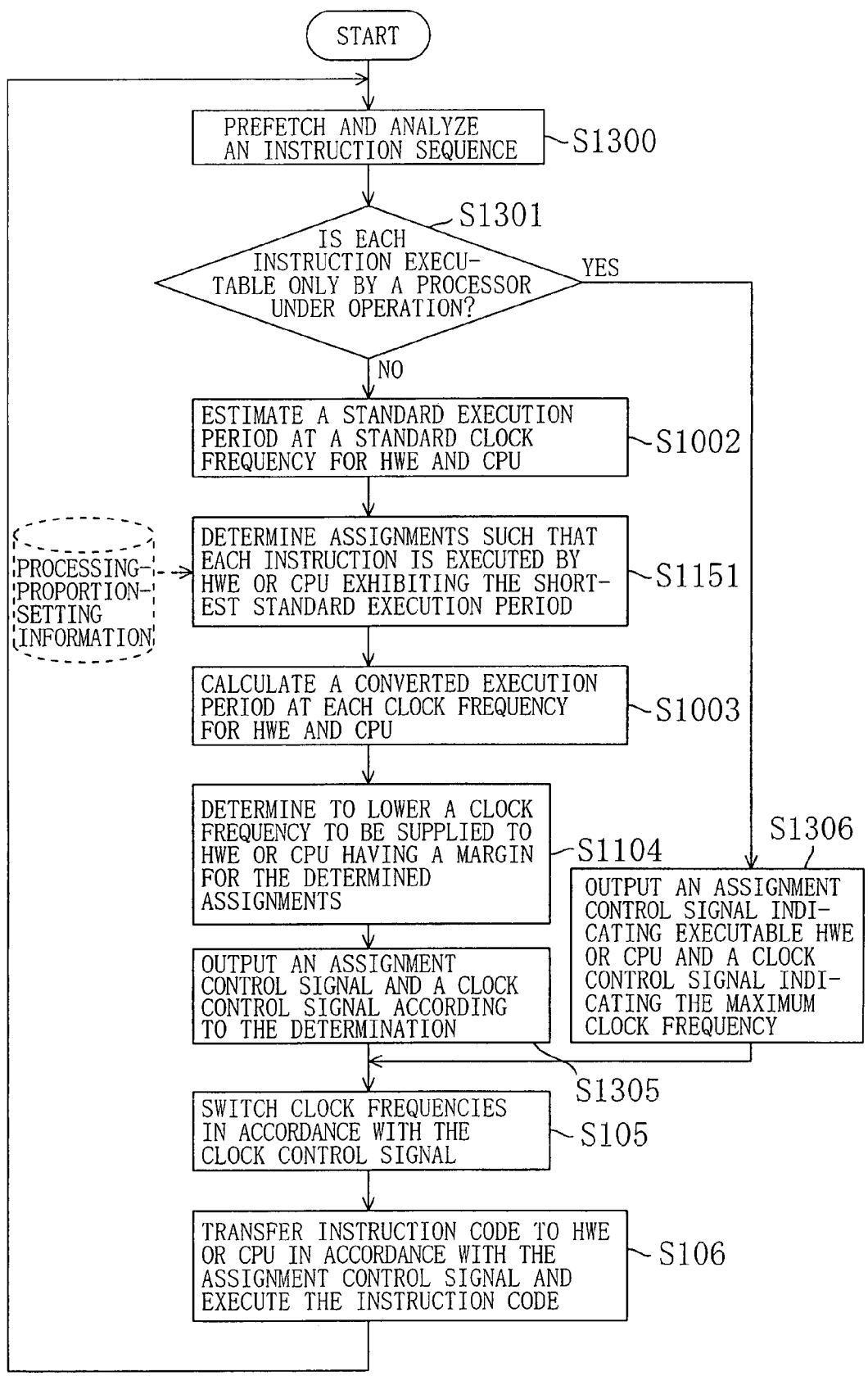
FIG. 16 is a flowchart showing operation of a processor system according to a modified example of embodiment 3.

Operation of the processor system thus configured is different from that in embodiment 3 (shown in FIG. 14) as shown in FIG. 16. (This difference is similar to the difference between operation (shown in FIG. 8) of the instruction sequence optimization device of embodiment 2 and operation (shown in FIG. 10) of the device of the modified example thereof.)

(S1151) After standard execution periods have been calculated (S1002), assignments are determined such that an instruction executable by both the processors is executed by one of the processors which exhibits a shorter standard execution period based on the standard execution periods.

(S1104) Unlike (S1004) in FIG. 14, only clock frequencies are determined. Specifically, when instructions are executed at standard clock frequencies by respective processors assigned at (S1151), the clock frequencies are determined such that a processor in which a waiting time arises (i.e., which has a margin) before termination of the other processors is supplied with a clock signal with the minimum frequency that reduces this waiting time and does not affect the total processing time. Accordingly, power consumption is reduced without degradation of the processing ability of the processor system within the range of assignments to processors as described above.

After the assignments to processors and the clock frequencies have been to determined as described above, an assignment control signal and a clock control signal according to the determination is output to the instruction assignment controlling section 102 and the clock controlling section 106 at (S1305) as in embodiment 3. In (S105) through (S106), the clock controlling section 106 switches the frequencies of clock signals to be output to the CPU 103, the HWE 104 and the SRAM 105 and the instruction assignment controlling section 102 transfers instruction code to the CPU 103 or the HWE 104 to have the instructions executed.

As described above, each instruction is executed by a processor exhibiting a shorter standard execution period, so that efficiency in executing instruction code is enhanced and thereby the total number of necessary clocks is reduced. In addition, the frequency of a clock signal supplied to a processor having a margin in its execution period is reduced, so that unnecessary toggling of transistors is suppressed, thus greatly reducing power consumption. Moreover, the process for determining a processor having a shorter standard execution period is easier than the process of obtaining a combination for achieving the lowest power consumption out of various combinations of assignments as in embodiment 3. In addition, clock frequencies are determined only for a combination of assignments to a set of processors, so that the circuit scales of the assignment determining section 511 and the clock frequency determining section 512 are reduced.

In the modified example of embodiment 3, to reduce the scale of hardware for determining a processor exhibiting a shorter standard execution period and to shorten the execution period for the entire instruction code sequence by increasing the parallelism in processing by processors, while permitting increase of power consumption to some extent, the proportion of the amount of processing by each processor is limited to a given range based on processing-proportion-setting information, for example, as indicated by the broken lines in FIGS. 15 and 16.

Instead of assignments for having each instruction executed by a processor exhibiting the shortest standard execution period, assignments to processors may be determined such that the total execution period is the shortest when all the processors operate at the standard clock frequencies, for example. In addition, the scale of hardware for determining assignments to processors may be reduced by limiting the proportion in the amount of processing by each processor to a given range and by determining assignments to reduce the execution period within the given range.

Embodiment 4

In embodiment 1, assignments to processors and control of clock frequencies are both based on flags added to instruction code. In embodiment 3, the assignments and the control are based on an analysis of instruction code by a processor system. Alternatively, only assignments to processors may be based on flags and the control of clock frequencies may based on the analysis.

Figure 17:
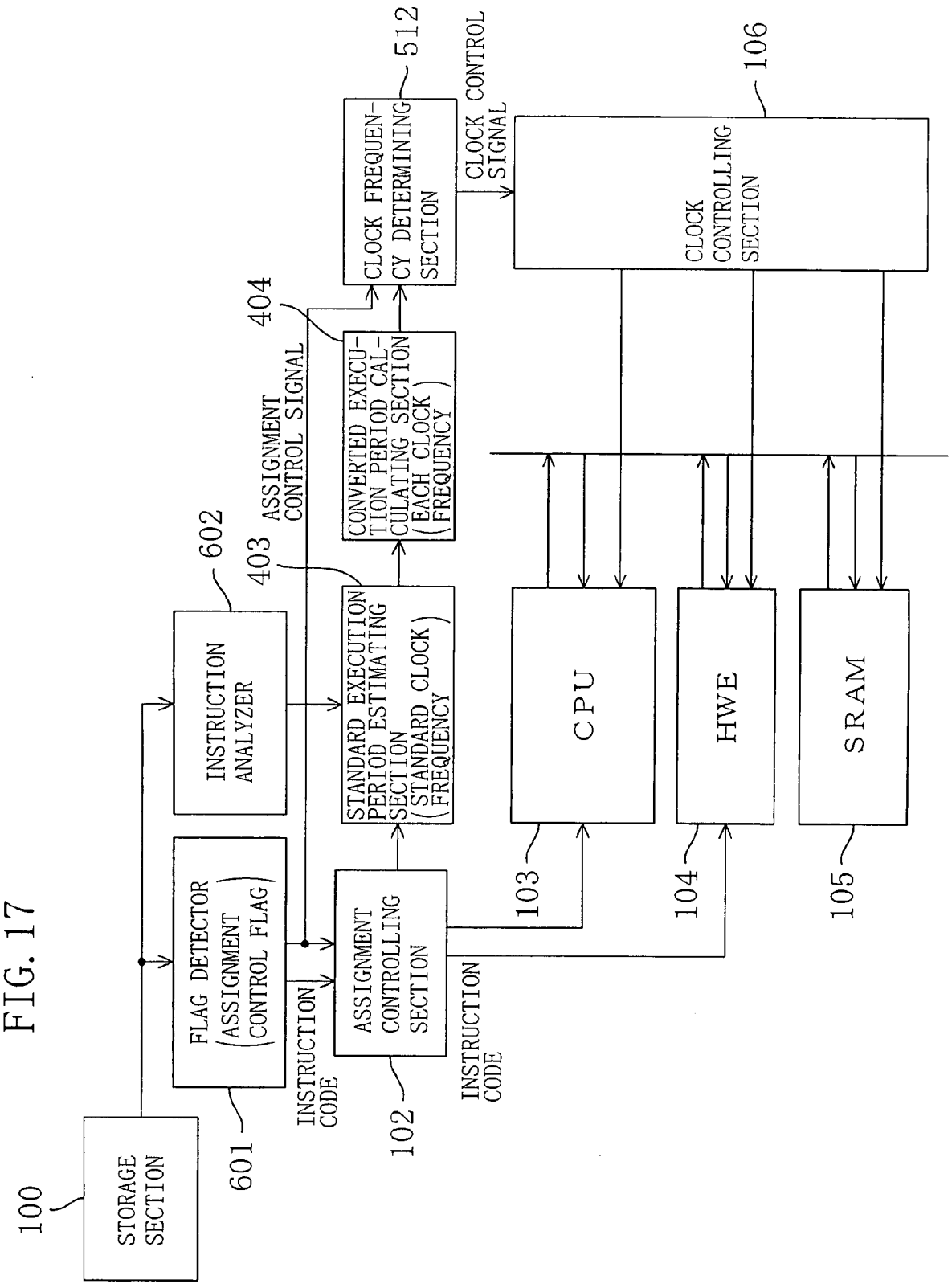
FIG. 17 is a block diagram showing a configuration of a main portion of a processor system according to embodiment 4.

As shown in FIG. 17, for example, a processor system according to this embodiment is different from that of embodiment 3 (shown in FIG. 13) in including: a flag detector 601; an instruction analyzer 602; and a clock frequency determining section 512 instead of the instruction analyzer 402 and the assignment/clock frequency determining section 405 of embodiment 3.

The flag detector 601 is different from the flag detector 101 of embodiment 1 (shown in FIG. 1) in detecting only an assignment control flag included in the instruction code, and outputs the instruction code read out from a storage section 100 to an instruction assignment controlling section 102 as well as detects an assignment control flag to output an assignment control signal according to this flag to the instruction assignment controlling section 102 and the clock frequency determining section 512.

The instruction analyzer 602 has a function of analyzing information necessary for determining clock frequencies, i.e., the relationship among instructions (dependence relationship among processes) or constraints on execution timings, out of the functions of the instruction analyzer 202 of the modified example (shown in FIG. 9) of embodiment 2.

The clock frequency determining section 512 is the same as that of the modified example (shown in FIG. 15) of embodiment 3, and determines clock frequencies based on an assignment control signal output from the flag detector 601 such that when a CPU 103 and an HWE 104 operate at, for example, their standard clock frequencies, one of these processors which has a larger margin in its processing operates at the minimum clock frequency that does not affect the total processing time.

Figure 18:
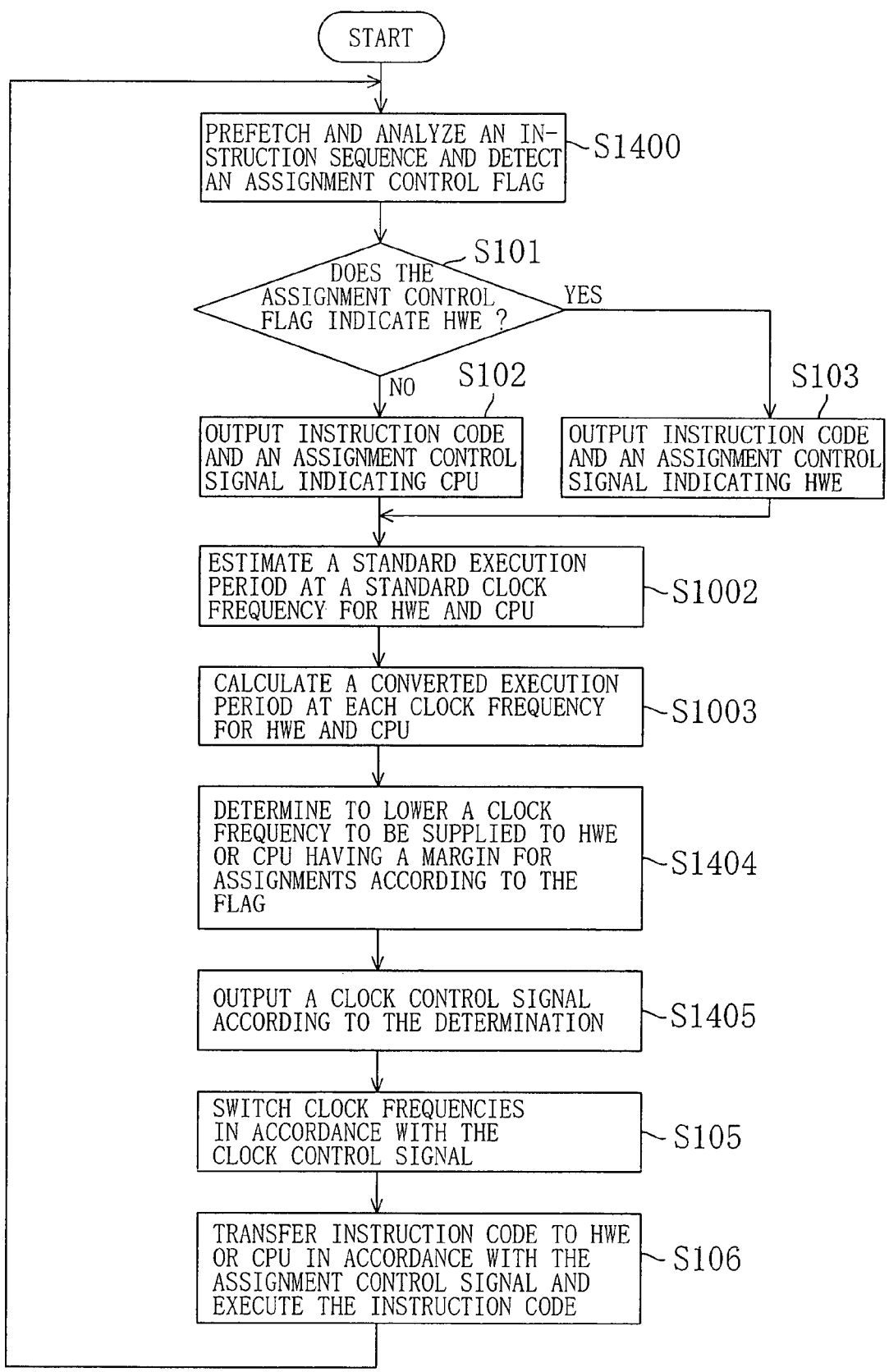
FIG. 18 is a flowchart showing operation of the processor system of embodiment 4.

Hereinafter, it will be described how the processor system thus configured operates with reference to FIG. 18.

(S1400) The flag detector 601 prefetches instruction code (or instruction code sets) stored in the storage section 100 and detects an assignment control flag contained in the instruction code. The instruction analyzer 602 analyzes constraints on execution timings in the prefetched instruction code, for example.

(S101) to (S103) Then, the flag detector 601 outputs an assignment control signal indicating the CPU 103 or the HWE 104 based on the detection result of the assignment control flag to the instruction assignment controlling section 102. The instruction code is output to the instruction assignment controlling section 102 with the flag added thereto or removed therefrom.

(S1002) A standard execution period estimating section 403 estimates standard execution periods during which instructions are executed by processors at respective standard clock frequencies.

(S1003) A converted execution period calculating section 404 calculates converted to execution periods necessary for respective executions of the instructions by the processors at various clock frequencies.

(S1404) The clock frequency determining section 512 determines the frequencies of clock signals to be supplied to processors based on an assignment control signal according to the assignment control flag output from the flag detector 601. Specifically, when the instructions are executed by the processors at standard clock frequencies according to the flag, the clock frequencies are determined such that a processor in which a waiting time arises (i.e., which has a margin) before termination of processing by the other processors is supplied with a clock signal with the minimum frequency that reduces this waiting time and does not affect the total processing time. Accordingly, power consumption is reduced without degradation of the processing ability of the processor system within the range of assignments to processors as described above.

(S1405) The clock frequency determining section 512 outputs, to the clock controlling section 106, a clock control signal based on the determination of the clock frequencies.

(S105) to (S106) The clock controlling section 106 switches the frequencies of clock signals to be output to the CPU 103, the HWE 104 and an SRAM 105 in accordance with the clock control signal. The instruction assignment controlling section 102 transfers the instruction code to the CPU 103 or the HWE 104 in accordance with the assignment control signal and then the instructions are executed.

As described above, the assignments to processors and the control of clock frequencies are performed in the manner described above, thus reducing power consumption without degradation of the processing ability. In addition, assignments to processors are performed based on the assignment control flag. Therefore, the instruction analyzer 602 only needs to analyze, for example, constraints on execution timings necessary to determine clock frequencies. The clock frequency determining section 512 only needs to determine clock frequencies for a combination of assignments to a set of processors. Accordingly, as compared to the processor system of embodiment 3, the circuit scales of the instruction analyzer 602 and the clock frequency determining section 512 are reduced.

Embodiment 5

Figure 19:
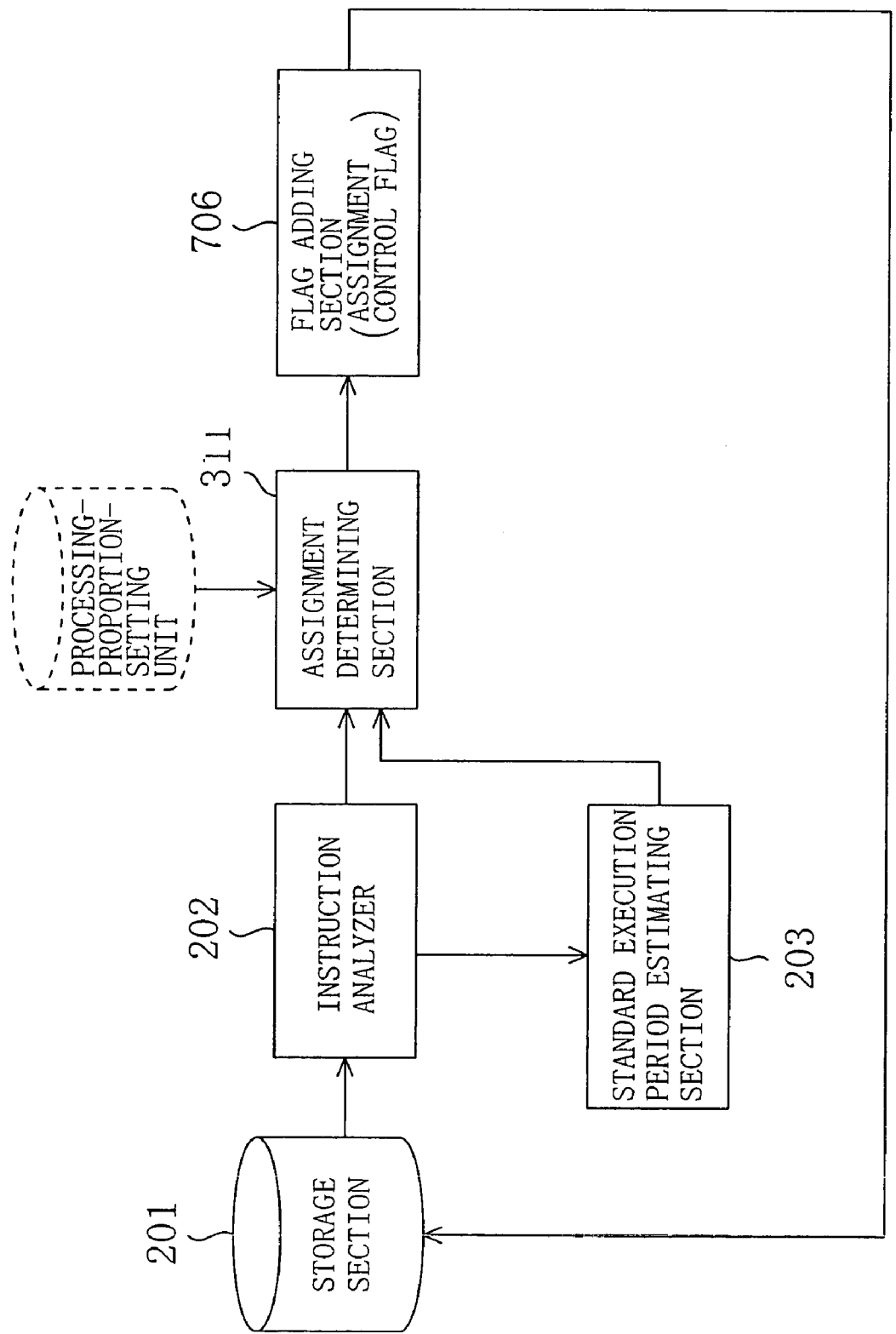
FIG. 19 is a block diagram showing a configuration of an instruction sequence optimization device according to embodiment 5.

Instruction code to which only a flag for controlling instruction assignments to processors is added as described in embodiment 4 can be generated by an instruction sequence optimization device as shown in FIG. 19, for example.

Specifically, functions necessary to add an assignment control flag are provided to the instruction sequence optimization device of the modified example (shown in FIG. 9) of embodiment 2, and a flag adding section 706 adds only an assignment control flag to instruction code in accordance with determination by an assignment determining section 311.

Figure 20:
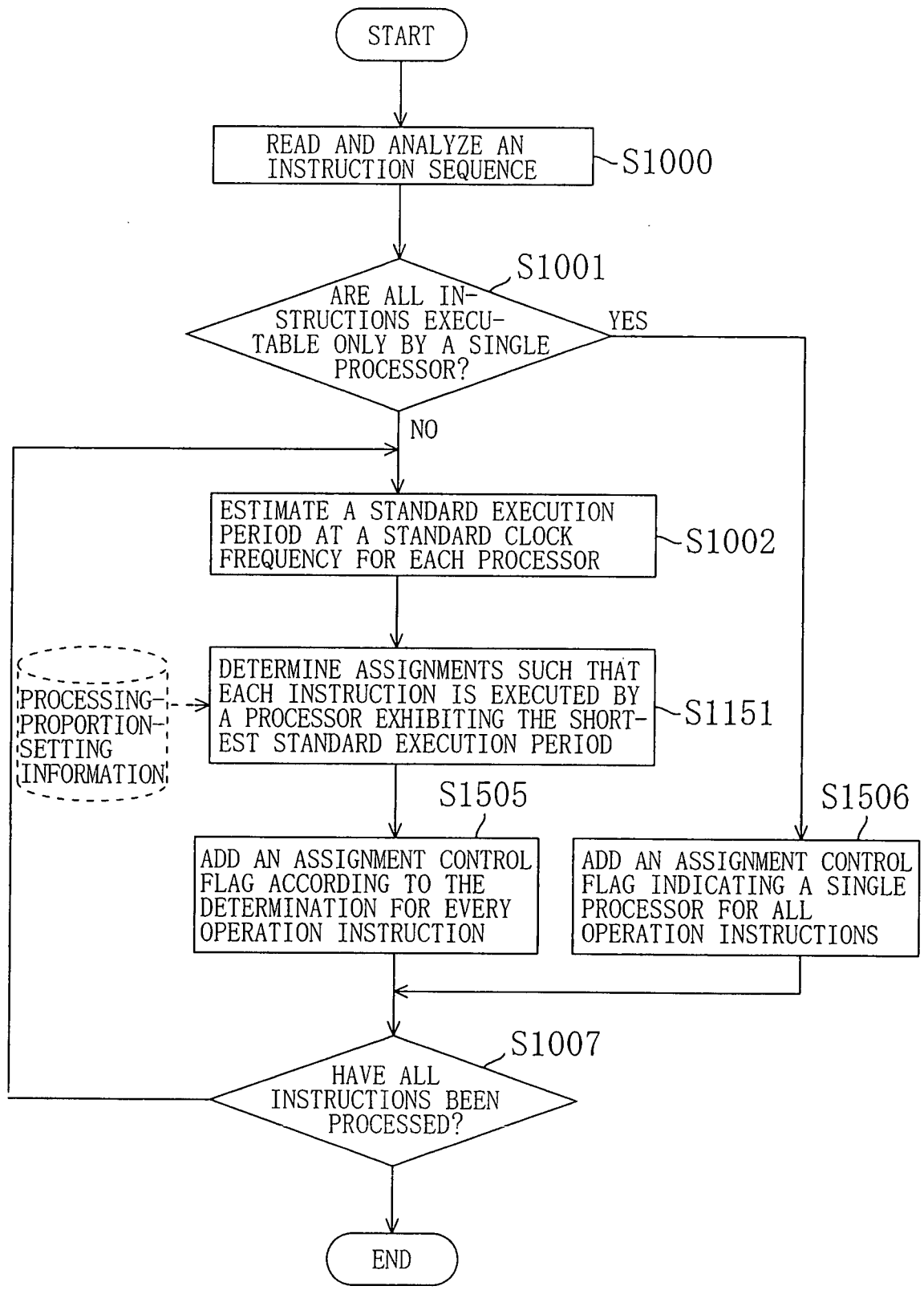
FIG. 20 is a flowchart showing operation of the instruction sequence optimization device of embodiment 5.

Operation of this instruction sequence optimization device is different from that in the modified example (shown in FIG. 10) of embodiment 2 only in that processes (S1003) and (S1104) for determining clock frequencies are omitted and only an assignment control flag is added in (S1505) and (S1506), as shown in FIG. 20.

As in the modified example of embodiment 2, in this embodiment, the proportion of the amount of processing by each processor may also be limited to a given range based on processing-proportion-setting information, for example, as indicated by the broken lines in FIGS. 19 and 20, assignments to processors may also be determined so as to minimize the total execution period, or executions of instructions may also be rearranged in a different order.

Embodiment 6

An example of a processor system in which clock frequencies are controlled as described above and power supply voltages to be supplied to a CPU 103 and other processors are controlled will be described. Reduction of a clock frequency increases a margin for a delay in a circuit and thus delay time in the circuit is allowed to be increased. This enables reduction of a power supply voltage. Since power consumption varies with the square of the power supply voltage, power consumption can be greatly reduced.

Figure 21:
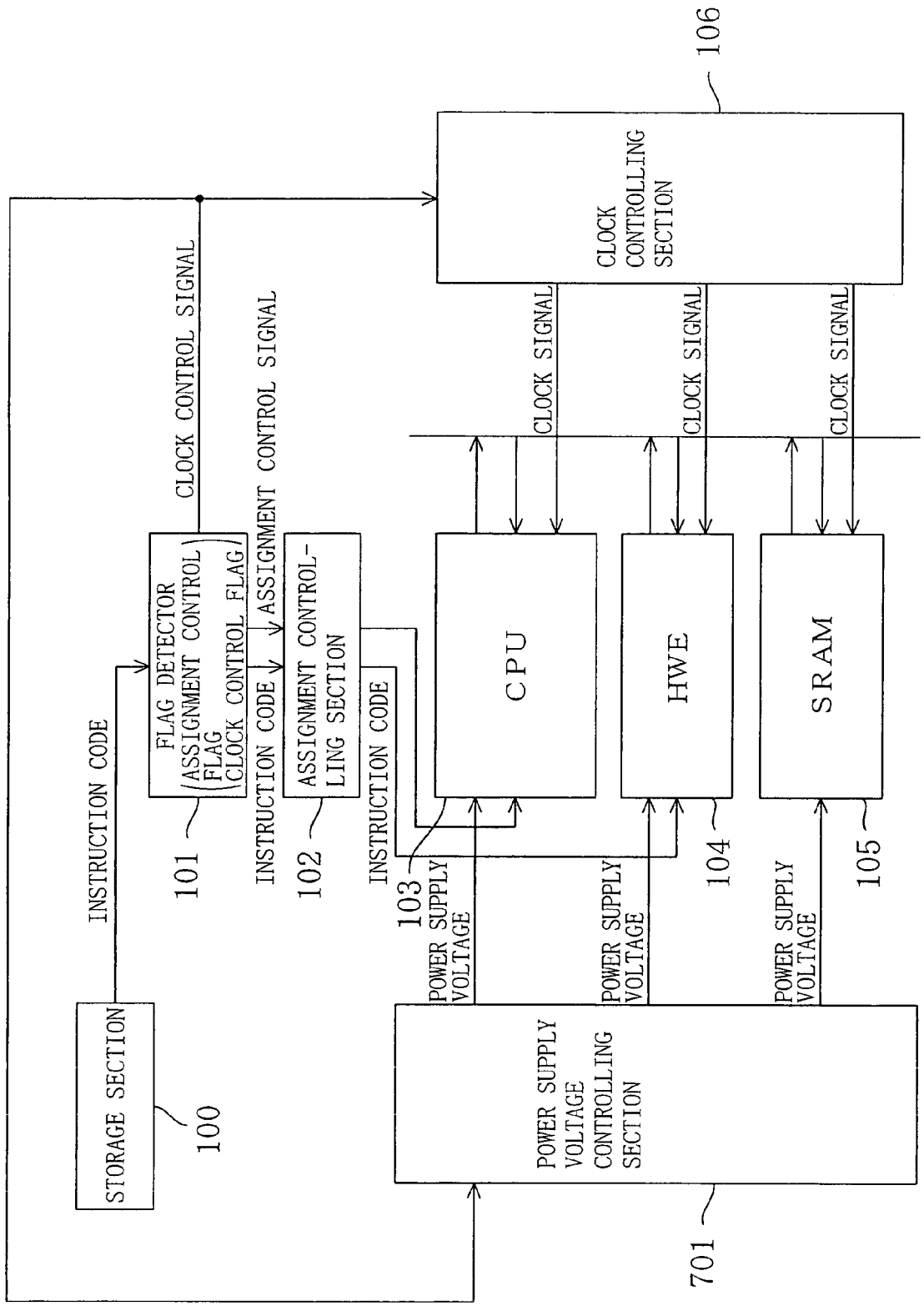
FIG. 21 is a block diagram showing a configuration of a main portion of a processor system according to embodiment 6.

Specifically, as shown in FIG. 21, for example, a processor system according to this embodiment includes a power supply voltage controlling section 701 (voltage controlling means) in addition to the configuration of embodiment 1 (shown in FIG. 1). The power supply voltage controlling section 701 supplies power supply voltages previously set to be associated with clock frequencies, i.e., power supply voltages each of which decreases from a rated voltage with reduction of the associated one of the clock frequencies, to a CPU 103, an HWE 104 and an SRAM 105, respectively, in accordance with a clock control signal output from a flag detector 101. Operation of this processor system is the same as that in embodiment 1 (shown in FIG. 4) except for that the power supply voltages output from the power supply voltage controlling section 701 are switched in accordance with switching of the respective clock frequencies by the clock controlling section 106.

As described above, the power supply voltages decrease as the respective clock frequencies are reduced, thus further reducing power consumption without affecting operation and the processing ability of the processor system.

The power supply voltages supplied to the CPU 103 and other processors are not necessarily equal to each other with respect to the same clock frequency and may be set according to circuit characteristics or the like.

The timing of switching a power supply voltage to a higher level may be earlier than the timing of switching a clock frequency to a higher frequency so as to ensure a sufficient margin for a circuit delay in the switching of the clock frequency.

As already described in embodiment 1, the supply of a power supply voltage may be suspended when the supply of a clock signal is cut off to stop operation of the CPU 103 or the HWE 104, or may be suspended only for the HWE 104, for example. The timing of resuming the suspended supply of the power supply voltage may be earlier than the timing of starting the supply of the clock signal. In addition, a rate voltage may be supplied during a period from when the first instruction code is prefetched to when a flag is detected for the power-on or reset of the entire processor system, thus easily ensuring operation of a processor which executes the first instruction code.

Embodiment 7

Instead of controlling power supply voltages as described above, the substrate voltage of a semiconductor substrate on which a CPU 103 and other components are formed may be controlled. Specifically, if the substrate voltage is controlled in such a manner as to increase the threshold voltage of a transistor formed on the semiconductor substrate, delay time of a circuit increases whereas leakage current of the transistor decreases. If a clock frequency decreases to increase a margin for a delay in the circuit, the substrate voltage is controlled accordingly to increase the threshold voltage, thus reducing power consumption.

Figure 22:
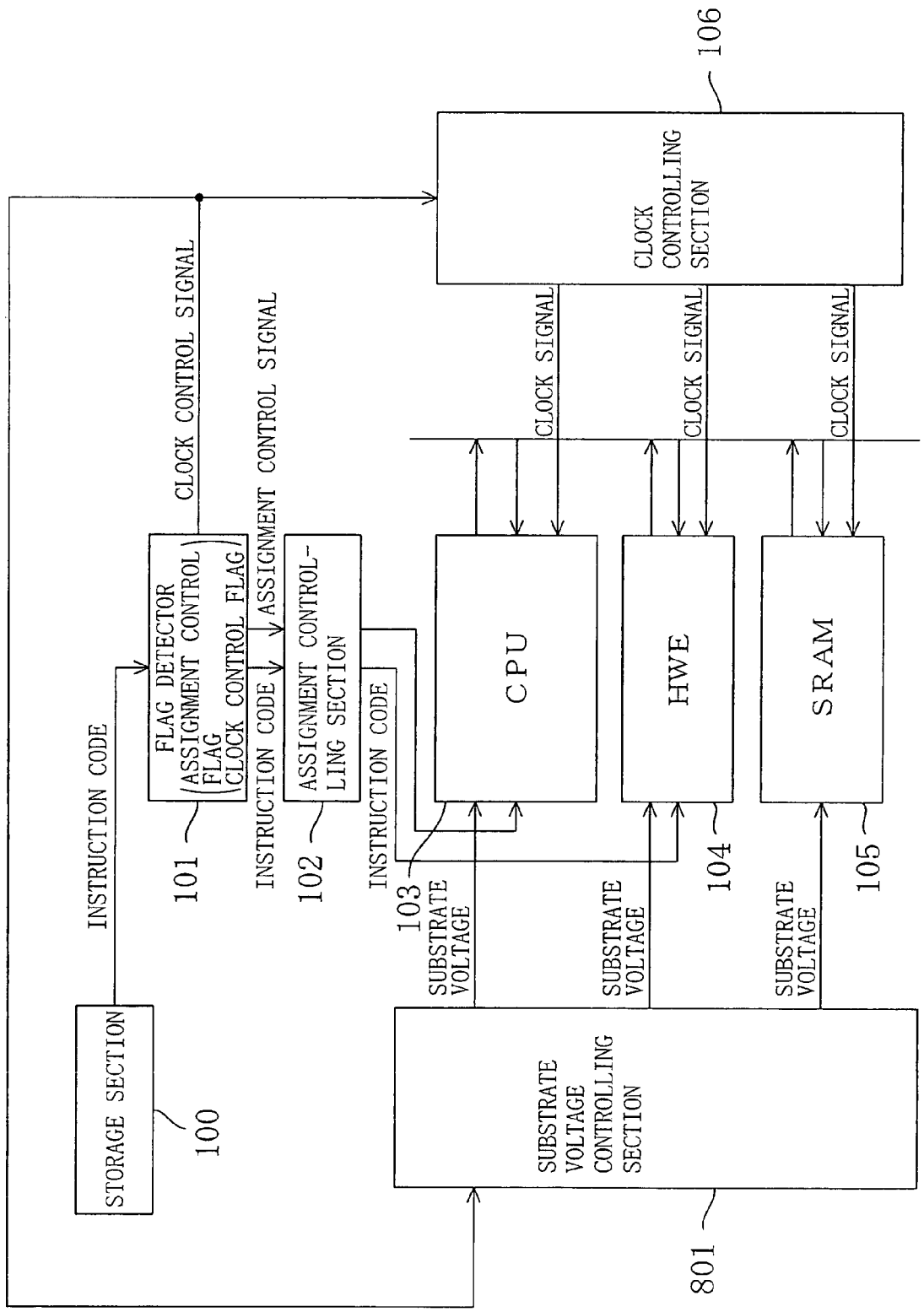
FIG. 22 is a block diagram showing a configuration of a main portion of a processor system according to embodiment 7.

More specifically, in a processor system according to this embodiment, as shown in FIG. 22, for example, a substrate voltage controlling section 801 (voltage controlling means) is provided in addition to the configuration described in embodiment 1 (shown in FIG. 1). The substrate voltage controlling section 801 supplies a substrate voltage previously set in associated with a clock frequency, i.e., such a substrate voltage (reverse bias voltage) that increases the threshold voltage as the clock frequency decreases, to a CPU 103 or another processor in accordance with a clock control signal output from a flag detector 101.

Operation of this processors system is the same as that in embodiment 1 (shown in FIG. 4) except for that the substrate voltages output from the substrate voltage controlling section 801 are switched in accordance with the switching of the clock frequencies by a clock controlling section 106.

As described above, the substrate voltages are controlled with the clock frequencies reduced, thus further reducing power consumption without affecting operation and the processing ability of the processor system.

As described about the power supply voltages in embodiment 6, substrate voltages supplied to the CPU 103 and other processors may differ from each other with respect to the same clock frequency. When the supply of a clock signal is stopped, a voltage at the same level as the associated power supply voltage may be applied as a substrate voltage.

Embodiment 8

Figure 23:
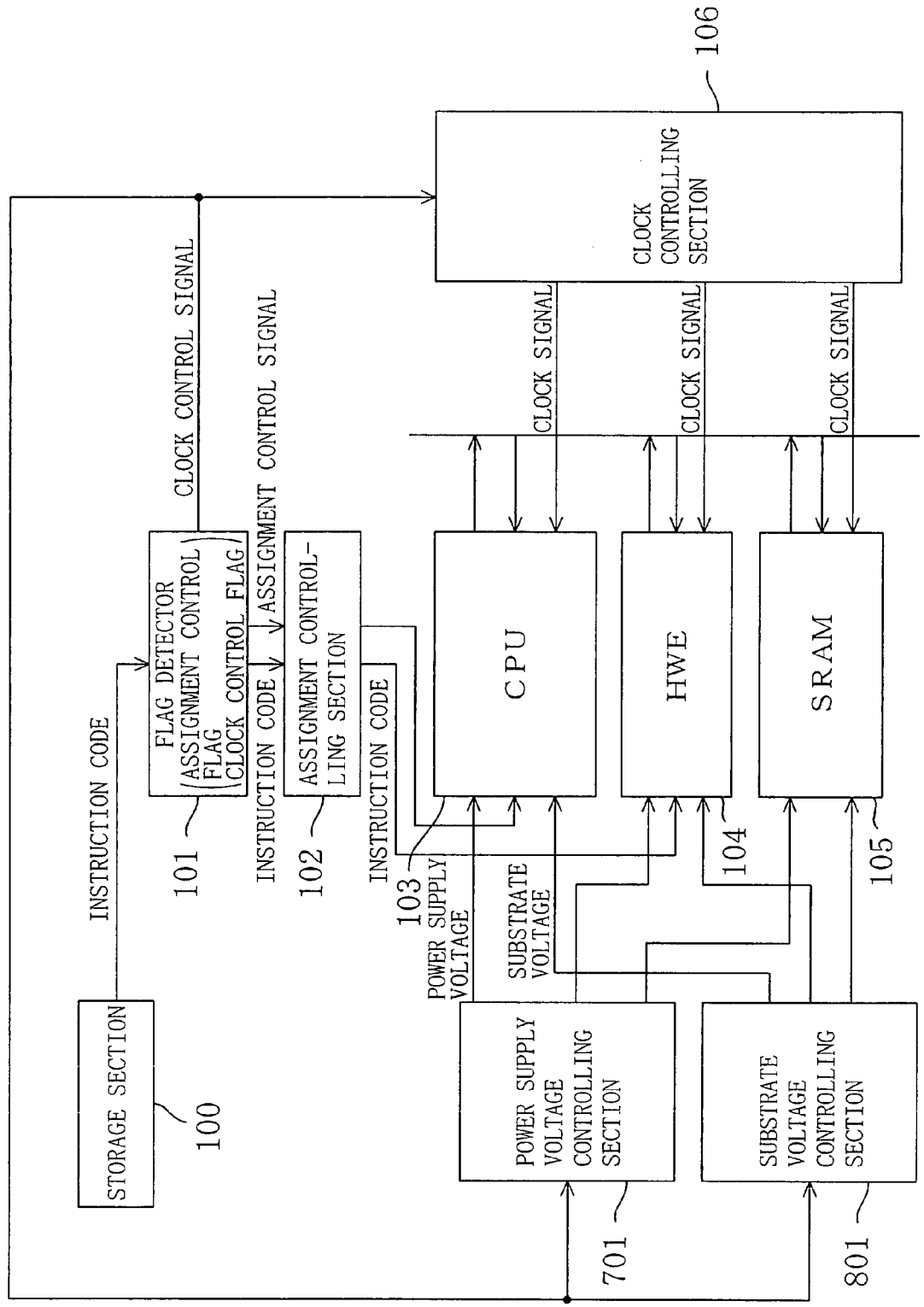
FIG. 23 is a block diagram showing a configuration of a main portion of a processor system according to embodiment 8.

As shown in FIG. 23, for example, both the power supply voltage controlling section 701 and the substrate voltage controlling section 801 may be provided so as to control power supply voltages and substrate voltages in accordance with clock frequencies. In such a case, combinations of power supply voltages and substrate voltages associated with clock frequencies determined by the power supply voltage controlling section 701 and the substrate voltage controlling section 801 are optimized according to characteristics of a semiconductor integrated circuit or the like.

Specifically, for example, if a clock frequency is lower than a standard clock frequency and leakage current is relatively large, a power supply voltage may be reduced and a reverse bias voltage may be applied to a substrate so as to increase the threshold voltage within the range of delay time permissible depending on the clock frequency (the reduction and the application both increase the delay time and reduce power consumption) such that power consumption is reduced. On the other hand, if the leakage current is relatively small, the power supply voltage may be greatly reduced (resulting in that the delay time increases and power consumption is reduced) and a forward bias voltage may be applied to the substrate so as to reduce the threshold voltage (resulting in that the delay time decreases and the leakage current increases) such that the delay time permissible depending on the clock frequency is satisfied as a result and power consumption is greatly reduced by the reduction of the power supply voltage.

As already described in embodiments 6 and 7, in this embodiment, each of the power supply voltages and substrate voltages to be supplied to the CPU 103 and other processors may be different from each other with respect to the same clock frequency. If a power supply voltage is supplied even with the supply of a clock signal suspended, a voltage at the same level as the power supply voltage may be applied as a substrate voltage, for example. In addition, if the supply of the power supply voltage is stopped with the supply of the clock signal suspended, the supply of the substrate voltage may also be stopped.

Embodiment 9

Figure 24:
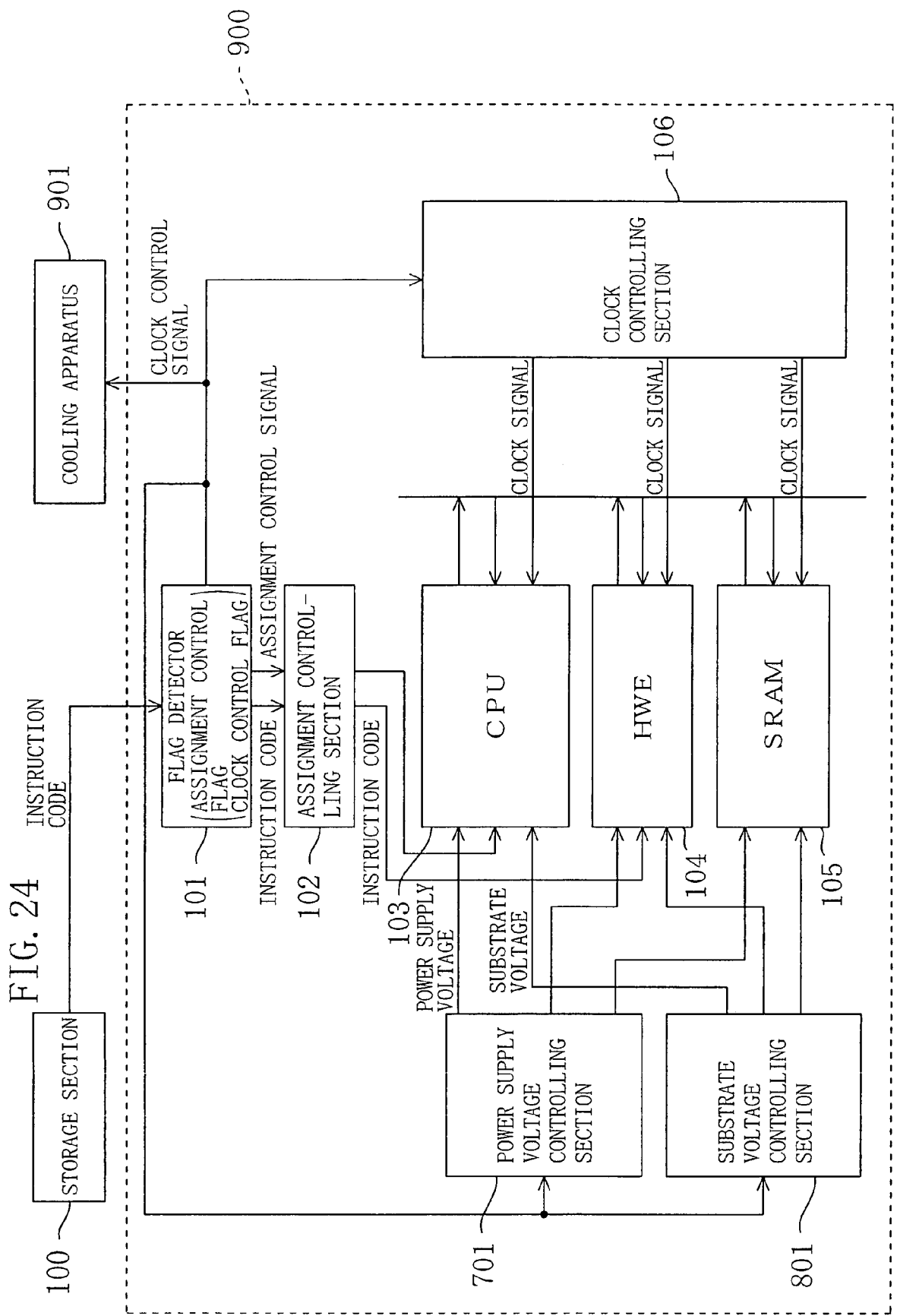
FIG. 24 is a block diagram showing a configuration of a main portion of a processor system according to embodiment 9.

Once clock frequencies are determined as described above, power consumption and heat release from a processor system are approximately determined. In view of this, as shown in FIG. 24, for example, a cooling apparatus 901 (cooling means and cooling controlling means) including a cooling fan for cooling a semiconductor integrated circuit 900 may be controlled based on a clock control signal. More specifically, the cooling apparatus 901 controls the rotational speed of the cooling fan by referring to a table in which a given control value associated with a clock frequency, for example, is recorded, cools the semiconductor integrated circuit 900 with a cooling ability depending on the clock frequency, a power supply voltage (which is determined according to the clock frequency as described above) and leakage current (which is determined by a substrate voltage determined according to the clock frequency). This ensures prevention of thermal runaway of the semiconductor integrated circuit 900 and suppresses power consumption involved in cooling.

In the foregoing embodiments, one CPU 103 and one HWE 104 are provided. However, the present invention is not limited to this. Each type of processors may be provided, e.g., a plurality of HWEs 104 having the same function or different functions and a plurality of CPUs 103 having the same function or different functions may be provided. In such a case, the same advantages are still obtained.

In embodiment 1, for example, flags added to instruction code are used as information indicating assignments to processors and clock frequencies in the instruction code. The present invention is not limited to this, and it is sufficient that information indicating, for example, assignments to processors is substantially included in the instruction code. For example, it is sufficient to determine which one of the CPU 103 and the HWE 104 executes an instruction by instruction code itself.

In embodiments 6 through 9, the power supply voltage controlling section 701 and others are directly controlled based on the clock control signal. However, the present invention is not limited to this, and the control only needs to be performed based on a control signal allowing power supply voltages, for example, to be appropriately set in accordance with clock frequencies.

The components described in the foregoing embodiments may be variously combined as long as these combinations are logically practicable. Specifically, for example, the configuration for controlling power supply voltages and substrate voltages as described in embodiments 6 through 9 or the configuration for controlling a cooling means may be applied to a processor system for controlling instruction assignments to processors and clock frequencies by analyzing instruction code as described in embodiments 3 and 4 (shown in FIGS. 13, 15 and 17). In addition, both of the flag detector 101 of embodiment 1 (shown in FIG. 1) and the instruction analyzer 402 of embodiment 3 (shown in FIG. 13) may be provided to implement the functions described in these embodiments so that assignments to processors and clock frequencies are controlled irrespective of the presence of, for example, flags in instructions to be executed.

As described above, according to the present invention, a clock frequency is controlled in accordance with an instruction to be executed for each processor, thus reducing power consumption without degradation of the processing ability. In addition, power supply voltages and substrate voltages to be supplied to processors are controlled in accordance with the control of the clock frequencies, thus further reducing power consumption.

What is claimed is:

1. An instruction sequence optimization device for optimizing an instruction sequence to be executed by a processor system including a plurality of processors, the instruction sequence optimization device being characterized by comprising:

instruction analyzing means for analyzing whether instructions included in the instruction sequence are executable by the respective processors or not and for analyzing constraints on the timings of executing the respective instructions;

execution period estimating means for estimating execution periods required of the respective processors to execute the instructions;

assignment determining means for determining assignments of the instructions to the processors based on a result of the analysis and the estimated execution periods; and control information adding means for adding assignment control information assigning the processor which will process the instruction to the instruction sequence in accordance with the determination by the assignment determining means.

2. The instruction sequence optimization device of claim 1, characterized by further comprising:

clock frequency determining means for determining the frequencies of clock signals to be supplied to the respective processors, in accordance with the instructions to be executed by the processors according to the assignments; and clock control information adding means for adding clock control information to the instruction sequence in accordance with the determination by the clock frequency determining means.

3. The instruction sequence optimization device of claim 2, characterized in that the clock frequency determining means is configured to make a determination based on the estimated execution periods and the determined assignments to the processors such that one of the processors in which a waiting time arises when the processors operate with clock signals having a predetermined frequency is supplied with a clock signal having a frequency lower than the predetermined frequency.

4. The instruction sequence optimization device of claim 1, characterized by further comprising rearrangement means for rearranging executions of instructions included in the instruction sequence in a different order such that power consumption in executing the instruction sequence by the processor system is lower than that before the rearrangement.

5. A recording medium containing an instruction sequence optimization program for optimizing an instruction sequence to be executed by a processor system including a plurality of processors, which, when executed, makes a computer execute:

an instruction analyzing step of analyzing whether instructions included in the instruction sequence are executable by the respective processors or not and of analyzing constraints on the timings of executing the respective instructions;

an execution period estimating step of estimating execution periods required of the respective processors to execute the instructions;

an assignment determining step of determining assignments of the instructions to the processors based on a result of the analysis and the estimated execution periods; and an assignment control information adding step of adding assignment control information assigning the processor which will process the instruction to the instruction sequence in accordance with the determination in the assignment determining step.

6. The recording medium of claim 5, which, when executed, further makes a computer execute:

a clock frequency determining step of determining the frequencies of clock signals to be supplied to the respective processors, in accordance with the instructions to be executed by the processors according to the assignments; and a clock control information adding step of adding clock control information to the instruction sequence in accordance with the determination in the clock frequency determining step.

7. The recording medium of claim 6, characterized in that in the clock frequency determining step, a determination is made based on the estimated execution periods and the determined assignments to the processors such that one of the processors in which a waiting time arises when the processors operate with clock signals having a predetermined frequency is supplied with a clock signal having a frequency lower than the predetermined frequency.

8. The recording medium of claim 5, which, when executed, further makes a computer execute a rearrangement step of rearranging executions of instructions included in the instruction sequence in a different order such that power consumption in executing the instruction sequence by the processor system is lower than that before the rearrangement.

* * * * *